US012407472B2

(12) United States Patent
Zhou et al.

(10) Patent No.: US 12,407,472 B2
(45) Date of Patent: Sep. 2, 2025

(54) BEAM FAILURE DETECTION (BFD) IN DORMANCY BANDWIDTH PART (BWP)

(71) Applicant: QUALCOMM Incorporated, San Diego, CA (US)

(72) Inventors: Yan Zhou, San Diego, CA (US); Tao Luo, San Diego, CA (US); Peng Cheng, Beijing (CN); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 178 days.

(21) Appl. No.: 17/760,414

(22) PCT Filed: Feb. 23, 2021

(86) PCT No.: PCT/CN2021/077400
§ 371 (c)(1),
(2) Date: Aug. 9, 2022

(87) PCT Pub. No.: WO2021/169935
PCT Pub. Date: Sep. 2, 2021

(65) Prior Publication Data
US 2023/0069021 A1  Mar. 2, 2023

(30) Foreign Application Priority Data
Feb. 24, 2020 (WO) ................ PCT/CN2020/076401

(51) Int. Cl.
*H04L 5/00* (2006.01)
(52) U.S. Cl.
CPC .......... *H04L 5/0053* (2013.01); *H04L 5/0051* (2013.01); *H04L 5/0094* (2013.01)

(58) Field of Classification Search
CPC ... H04L 47/746; H04L 5/0037; H04L 5/0042; H04L 5/0048; H04L 5/0092;
(Continued)

(56) References Cited

U.S. PATENT DOCUMENTS

2015/0215929 A1* 7/2015 Damnjanovic ....... H04W 72/21
370/241
2019/0037498 A1 1/2019 Tseng et al.
(Continued)

FOREIGN PATENT DOCUMENTS

| CN | 110392380 A | 10/2019 |
| WO | 2018169848 | 9/2018 |

(Continued)

OTHER PUBLICATIONS

LG Electronics: "Considerations On Power Saving for NR", 3GPP TSG RAN WG1 Ah-Hoc Meeting 1901, R1-1900602, Taipei, Taiwan, Jan. 21-25, 2019, Jan. 11, 2019, 5 Pages. (Year: 2019).*
(Continued)

*Primary Examiner* — Romani Ohri
(74) *Attorney, Agent, or Firm* — Haynes and Boone, LLP

(57) ABSTRACT

Wireless communications systems and methods related to beam failure detection (BFD) in a dormancy bandwidth part (BWP) are provided. A user equipment (UE) determines to operate in a dormancy mode for a cell of a wireless communication network. The UE operates in the dormancy mode for the cell of the wireless communication network, where the operating in the dormancy mode includes performing a beam failure detection (BFD) in a dormancy bandwidth part (BWP) based on a configuration. The configuration may include a control resource set (CORESET) configuration for the dormancy BWP.

22 Claims, 15 Drawing Sheets

(58) Field of Classification Search
CPC ............... H04W 24/04; H04W 72/042; H04W 72/0453; H04W 72/046; H04W 72/0493; H04W 72/08; H04W 76/18; H04W 76/19
See application file for complete search history.

(56) References Cited

U.S. PATENT DOCUMENTS

| | | | |
|---|---|---|---|
| 2019/0306842 A1* | 10/2019 | Cirik | H04B 7/0617 |
| 2019/0306909 A1* | 10/2019 | Zhou | H04W 72/23 |
| 2019/0372830 A1 | 12/2019 | Zhang et al. | |
| 2019/0394660 A1 | 12/2019 | He et al. | |
| 2020/0052769 A1* | 2/2020 | Cirik | H04L 5/0051 |
| 2020/0221428 A1* | 7/2020 | Moon | H04B 7/024 |
| 2021/0058136 A1* | 2/2021 | Yang | H04W 72/0453 |
| 2021/0226684 A1* | 7/2021 | Koskela | H04L 5/0042 |
| 2021/0243741 A1* | 8/2021 | Lin | H04W 76/28 |
| 2022/0330155 A1* | 10/2022 | Cheng | H04W 72/0453 |

FOREIGN PATENT DOCUMENTS

| | | |
|---|---|---|
| WO | 2019216418 A1 | 11/2019 |
| WO | 2020015530 A1 | 1/2020 |
| WO | 2020028792 A1 | 2/2020 |
| WO | 2020032653 A1 | 2/2020 |

OTHER PUBLICATIONS

LG Electronics: "Considerations on Power Saving for NR", 3GPP TSG RAN WG1 Ah-Hoc Meeting 1901, R1-1900602, 3rd Generation Partnership Project, Mobile Competence Centre, 650, Route Des Lucioles, F-06921 Sophia-Antipolis Cedex, France, vol. RAN WG1, No. Taipei, Taiwan, Jan. 21, 2019-Jan. 25, 2019, Jan. 20, 2019 (Jan. 20, 2019), 5 Pages, XP051593449, Section 2, p. 3, p. 4.
Nokia, et al., "BED on dormant SCell", R2-2000678, 3rd Generation Partnership Project, Mobile Competence Centre, 650, Route Des Lucioles, F-06921 Sophia-Antipolis Cedex, France, vol. RAN WG2, No. Elbonia, Feb. 24, 2020-Mar. 6, 2020, Feb. 14, 2020, XP051849253, 1 Page, p. 1.
Qualcomm Incorporated: "Solutions for Fast SCG and SCell Activation", R1-1900922, 3rd Generation Partnership Project, Mobile Competence Centre, 650, Route Des Lucioles, F-06921 Sophia-Antipolis Cedex, France, vol. RAN WG1, No. Taipei, Taiwan, Jan. 21, 2019-Jan. 25, 2019, Jan. 12, 2019, XP051576459, 6 Pages, p. 3.
Supplementary European Search Report—EP21760730—Search Authority—Munich—Mar. 5, 2024.
International Search Report and Written Opinion—PCT/CN2020/076401—ISA/EPO—Nov. 26, 2020.
International Search Report and Written Opinion—PCT/CN2021/077400—ISA/EPO—May 8, 2021.
LG Electronics: "Discussion on Power Saving for CA Operation," 3GPP TSG RAN WG1 Meeting #94bis, R1-1810312, Chengdu, China, Oct. 8-12, 2018, Oct. 13, 2018 (Oct. 13, 2018), p. 2, 3 pages.
OPPO: "Introduction of Dormancy Behavior in NR", 3GPP TSG-RAN WG2 Meeting #107bis, R2-1913942, ChongQing, China, Oct. 14-18, 2019, Oct. 19, 2019 (Oct. 19, 2019), pp. 1-4, 4 pages.
LG Electronics: "Considerations On Power Saving for NR", 3GPP TSG RAN WG1 Ah-Hoc Meeting 1901, R1-1900602, Taipei, Taiwan, Jan. 21-25, 2019, Jan. 11, 2019, 5 Pages.
Nokia, et al., "BFD on Dormant SCell", 3GPP TSG-RAN WG2 Meeting #109e, R2-2000678, Elbonia, Feb. 24-Mar. 6, 2020, Feb. 14, 2020, 1 page.
Qualcomm Incorporated: "Solutions for Fast SCG and SCell Activation", 3GPP TSG-RAN WG1 Ad-Hoc Meeting 1901, R1-1900922, Taipei, Taiwan, Jan. 21-25, 2019, Jan. 12, 2019, pp. 1-6.

* cited by examiner

BEAM FAILURE DETECTION (BFD) IN DORMANCY BANDWIDTH PART (BWP)

CROSS-REFERENCE TO RELATED APPLICATIONS

The present application is a 35 U.S.C. 371 National Phase entry of Patent Cooperation Treaty (PCT) Application No. PCT/CN2021/077400, filed Feb. 23, 2021, which claims priority to and the benefit of Patent Cooperation Treaty (PCT) Application No. PCT/CN2020/076401, filed Feb. 24, 2020. The aforementioned applications are hereby incorporated by reference in their entireties as if fully set forth below and for all applicable purposes.

TECHNICAL FIELD

The present disclosure is directed to wireless communication systems and methods. Certain embodiments can enable and provide techniques for beam failure detection (BFD) in a dormancy bandwidth part (BWP).

INTRODUCTION

Wireless communications systems are widely deployed to provide various types of communication content such as voice, video, packet data, messaging broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long-term evolution (LIE) technology to a next generation new radio (NR) technology, which may be referred to as 5th Generation (5G). For example, NR is designed to provide a lower latency, a higher bandwidth or a higher throughput, and a higher reliability than LIE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

NR may utilize beamforming in combination with BWPs to benefit from the wider channel bandwidth available at higher frequencies (e.g., in a mmWave band). For instance, pathloss can be high in the higher frequency bands and wideband operations in the wider channel bandwidth can be costly. To overcome the high pathloss, a BS and/or a UE may perform analog and/or digital beamforming to create narrow directional beams for communications. To avoid having UEs to operate in the wide channel bandwidth, BWPs allows UEs to communicate with a BS using a frequency bandwidth smaller or narrower than the channel bandwidth. BWPs refers to the partitioning of a channel bandwidth into smaller frequency bands. For instance, in NR, a BS may configure a UE with a maximum of four BWPs in a channel bandwidth and the BS may activate one BWP for communications with the UE at any given time. The UE is not required to transmit or receive outside of the configured frequency range of the active BWP, and thus may provide power saving at the UE.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication by a first user equipment (UE), the method includes determining to operate in a dormancy mode for a cell of a wireless communication network; and operating in the dormancy mode for the cell of the wireless communication network, where the operating in the dormancy mode includes performing a beam failure detection (BFD) in a dormancy bandwidth part (BWP) based on a configuration.

In an additional aspect of the disclosure, a method of wireless communication performed by a base station (BS), the method includes determining a user equipment (UE) is operating in a dormancy mode for a cell of a wireless communication network; and transmitting, to the UE, a configuration for performing a beam failure detection (BFD) in a dormancy bandwidth part (BWP) associated with the dormancy mode.

In an additional aspect of the disclosure, a user equipment (UE) includes a processor configured to determine to operate in a dormancy mode for a cell of a wireless communication network; and operate in the dormancy mode for the cell of the wireless communication network, where the operating in the dormancy mode includes performing a beam failure detection (BFD) in a dormancy bandwidth part (BWP) based on a configuration.

In an additional aspect of the disclosure, a base station (BS) includes a processor configured to determine a user equipment (UE) is operating in a dormancy mode for a cell of a wireless communication network; and a transceiver configured to transmit, to the UE, a configuration for performing a beam failure detection (BFD) in a dormancy bandwidth part (BWP) associated with the dormancy mode.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that

DETAILED DESCRIPTION

Figure 1:
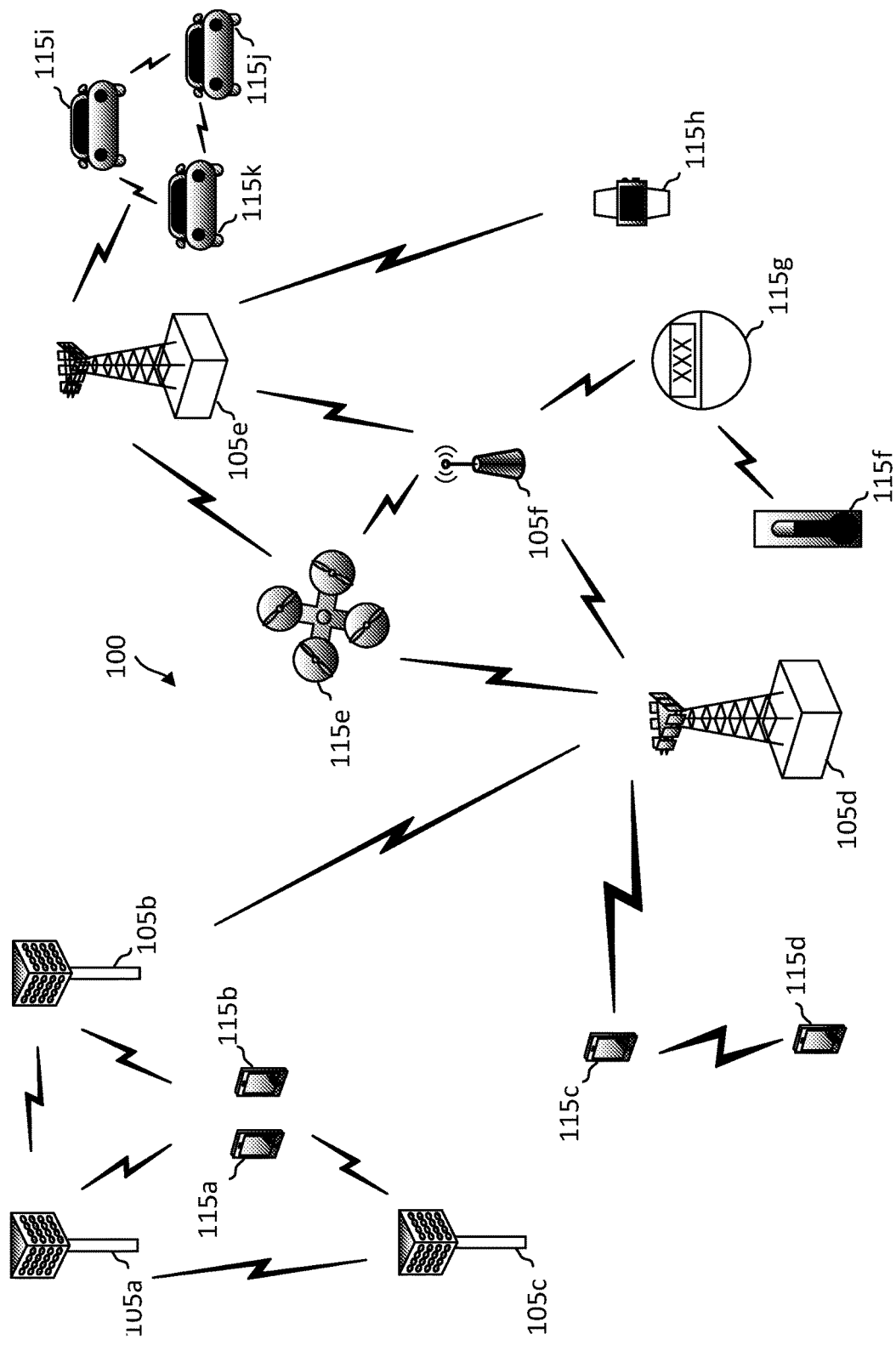
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LIE networks, Global System for Mobile Communications (GSM) networks, 5th Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LIE) is a release of UMTS that uses E-UTRA. UTRA, E-UTRA, GSM, UMTS and LIE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LIE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LIE, 4G, 5G, NR, and beyond with shared access to wireless spectrum between networks using a collection of new and different radio access technologies or radio air interfaces.

5G networks contemplate diverse deployments, diverse spectrum, and diverse services and devices that may be implemented using an OFDM-based unified, air interface. In order to achieve these goals, further enhancements to LIE and LIE-A are considered in addition to development of the new radio technology for 5G NR networks. The 5G NR will be capable of scaling to provide coverage (1) to a massive Internet of things (IoTs) with a ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

To apply beamforming techniques for communications, a BS and a UE may perform beam measurements and beam selections to determine one or more optimal beams for communications. An optimal beam may refer to a transmission beam that can provide a receiver with a high receive power and/or a high signal-to-noise ratio (SNR). For instance, the BS may transmit a set of references signals, such as synchronization signal block (SSBs), by sweeping through a number of spatial directions to facilitate initial beam measurements and selections. Additionally, the BS may configure the UE with a set of reference signals, which may include SSBs, tracking reference signals (TRSs), and/or channel state information-reference signals (CSI-RSs), for beam failure detection (BFD). The set of reference signals configured for BFD may be referred to as BFD reference signals (BFD RSs). For instance, the UE may monitor the BFD RSs and determine link quality or beam quality from measurements of the BFD RSs. The UE may detect a beam failure condition, for example, when a link quality measurement falls below a certain threshold. Upon detecting a beam failure, the UE may perform beam recovery with the BS, for example, by requesting the BS to use a transmission beam in a different spatial direction.

In a certain wireless communication network, a BS may configure a UE to monitor BFD RSs that are spatially quasi-co-located (QCLed) with a physical downlink control channel (PDCCH) demodulation reference signal (DMRS). In other words, the DL beams (or DL channel conditions) used for transmitting the BFD RSs may correspond to the DL beams (or DL channel conditions) used for transmitting the PDCCH DMRSs. In NR, there are several types of quasi colocation relationship, for example, in terms of delay spread, doppler spread, doppler shift, average delay, and/or spatial receive parameters. A BS may configure a UE with one or more control resource sets (CORESETs) in a BWP and may configure the UE with one or more PDCCH search spaces based on the CORESETs. Each CORESET may include one or more transmission configuration indication (TCI) states, which may indicate DL reference signals (e.g., SSBs, CSI-RSs, and/or TRSs) that are QCLed with a corresponding PDCCH DMRS.

In some aspects, a BS can configure a UE to operate in a dormancy BWP, for example, for power saving. Since the UE is not expected to perform PDCCH monitoring in the dormancy BWP, the BS may not configure the UE with a CORESET in the dormancy BWP. However, the BS expects the UE to perform BFD while operating in the dormancy BWP. Without a CORESET configured in the dormancy BWP, the UE may be unable to determine which resource(s) or BFD RSs to monitor for BFD.

The present disclosure describes mechanisms for BFD in a dormancy BWP. For example, a BS may configure a UE to operate in a dormancy mode for a cell in a network. The cell can be a primary cell (PCell) or a secondary cell (SCell). The BS may configure the UE with a BFD configuration for performing BFD when the UE operates in a dormancy BWP. In some aspects, the BS may configure the UE to exclude performing BFD in a dormancy BWP. In some aspects, the BS may configure the UE with a set of rules to determine BFD RSs and corresponding resources for BFD RS monitoring when the UE operates in the dormancy BWP.

In some aspects, the BS may configure the UE to perform BFD RS monitoring while operating in a dormancy BWP if the UE is configured with explicit BFD RSs. The BS may configure the UE to refrain from performing BFD if the UE is not configured with any explicit BFD RS. In some aspects, the BS may configure the UE to perform the BFD in the dormancy BWP by monitoring for one or more BFD RSs quasi-coloated (QCLed) with a CORESET in a non-dormancy BWP before the UE switches to the dormancy BWP. In some aspects, the BS may configure the UE with a non-dormancy BWP paired with the dormancy BWP. The BS may configure the UE to monitor for one or more BFD RSs that are QCLed with a CORESET in the paired non-dormancy BWP when the UE operates in the dormancy BWP. In some aspects, the BS may configure the UE with a CORESET in the dormancy BWP, but may configure a zero number of PDCCH candidates for the CORESET. The BS may configure the UE to monitor for one or more BFD RSs that are QCLed with a CORESET in the dormancy BWP.

In some aspects, the BS may configure the UE to perform BFD RS monitoring in a dormancy BWP if the UE is configured with implicit BFD RSs. The BS may configure the UE to refrain from performing BFD if the UE is not configured with any implicit BFD RS. In some aspects, the BS may configure the UE to monitor for one or more BFD RSs associated with a TCI state of a CORESET in a non-dormancy BWP before the UE switches to the dormancy BWP, a paired non-dormancy BWP, or the dormancy BWP.

In some aspects, the BS may transmit one or more BFD RSs fully within the dormancy BWP, partially within the dormancy BWP, and/or outside the dormancy BWP. In some aspects, the BS may configure the UE to perform measurements on a BFD RS that is fully within the dormancy BWP.

In some aspects, when a BFD RS is partially within the dormancy BWP, the BS may configure the UE to measure the portion of the BFD RS that is within the dormancy BWP. Alternatively, the BS may configure the UE to measure the entire BFD RS including the portion outside the dormancy BWP. In some aspects, when a BFD RS is outside the dormancy BWP, the BS may configure the UE exclude measurements on the BFD RS. Alternatively, the BS may configure the UE to switch to the BWP where the BFD RS is located or extend the BWP to include the BWP where the BFD RS is located and measure the BFD RS.

In some aspects, the BS may configure UE with a non-dormancy BWP via a radio resource control (RRC) configuration and later switches the RRC configured BWP to a dormancy BWP via downlink control information (DCI), media access control-control element (MAC-CE), or a wakeup signal (WUS). The transition of the BWP to the dormancy mode can be permanent or for a certain duration.

Aspects of the present disclosure can provide several benefits. For example, the configuring of rules for determining explicit BFD RSs QCLed with CORESET(s) in a certain BWP and/or implicit BFD RSs associated with TCI state(s) of CORESET(s) in a certain BWP enables a UE to perform BFD while operating in a dormancy BWP. Accordingly, the UE may monitor for beam quality in the dormancy BWP and may perform a beam recovery procedure with the BS to switch to another beam or beam pair (e.g., UL and/or DL beams) upon detecting a beam failure condition. In this way, when the BS determines to switch the UE back to a non-dormancy BWP at a later time, the BS and the UE may be ready for communication using beams from the most recent beam selection (e.g., based on the most recent beam recovery) instead of having to perform beam selection at the switching time. Accordingly, the present disclosure can reduce the activation time for switching from a dormancy BWP to a non-dormancy BWP.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point (e.g., an IEEE 802.11 AP), and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a hand-held device, a tablet computer, a laptop computer, a cordless phone, a wireless local loop (WLL) station, an IEEE 802.11 terminal station (STA), or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmit multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-step-size configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as V2V, V2X C-V2X communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request (e.g., RRC connection request) to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant.

In some aspects, the BS 105 may communicate with a UE 115 using HARQ techniques to improve communication reliability, for example, to provide a URLLC service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 receives the DL data packet successfully, the UE 115 may transmit a HARQ ACK to the BS 105. Conversely, if the UE 115 fails to receive the DL transmission successfully, the UE 115 may transmit a HARQ NACK to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft-combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications. Mechanisms for BWP configurations will be described more fully below in FIGS. 3 and 4.

In some aspects, the network 100 may operate over a higher frequency band (e.g., a mmWave band). The BSs 105 and the UEs 115 may apply analog and/or digital beamforming to form narrow directional beams for communications. To facilitate beamforming, a BS 105 and a UE 115 may perform beam measurements and selections to determine one or more optimal beams for communications. An optimal beam may refer to a transmission beam that can provide a receiver with a high receive power and/or a high SNR. For instance, the BS 105 may transmit a set of references signals, such as SSBs, in various spatial directions to facilitate initial beam measurements and selections. After the UE 115 successfully establishes a connection with the network 100, the BS 105 may configure the UE 115 with a set of reference signals, which may be SSBs, TRSs, and/or CSI-RSs, for BFD. For instance, the UE 115 may monitor the BFD RSs and determine the link quality from measurements of the BFD RSs. The UE 115 may detect a beam failure condition, for example, when a link quality measurement falls below a certain threshold, and may request the BS for a beam in a different spatial direction. In some aspects, a BS 105 may configure a UE 115 to operate in a dormancy BWP, for example, for power saving, and may configure the UE with a set of rules for performing BFD RS monitoring for BFD. Mechanisms for performing BFD in a dormancy mode are described in greater detail herein.

Figure 2:
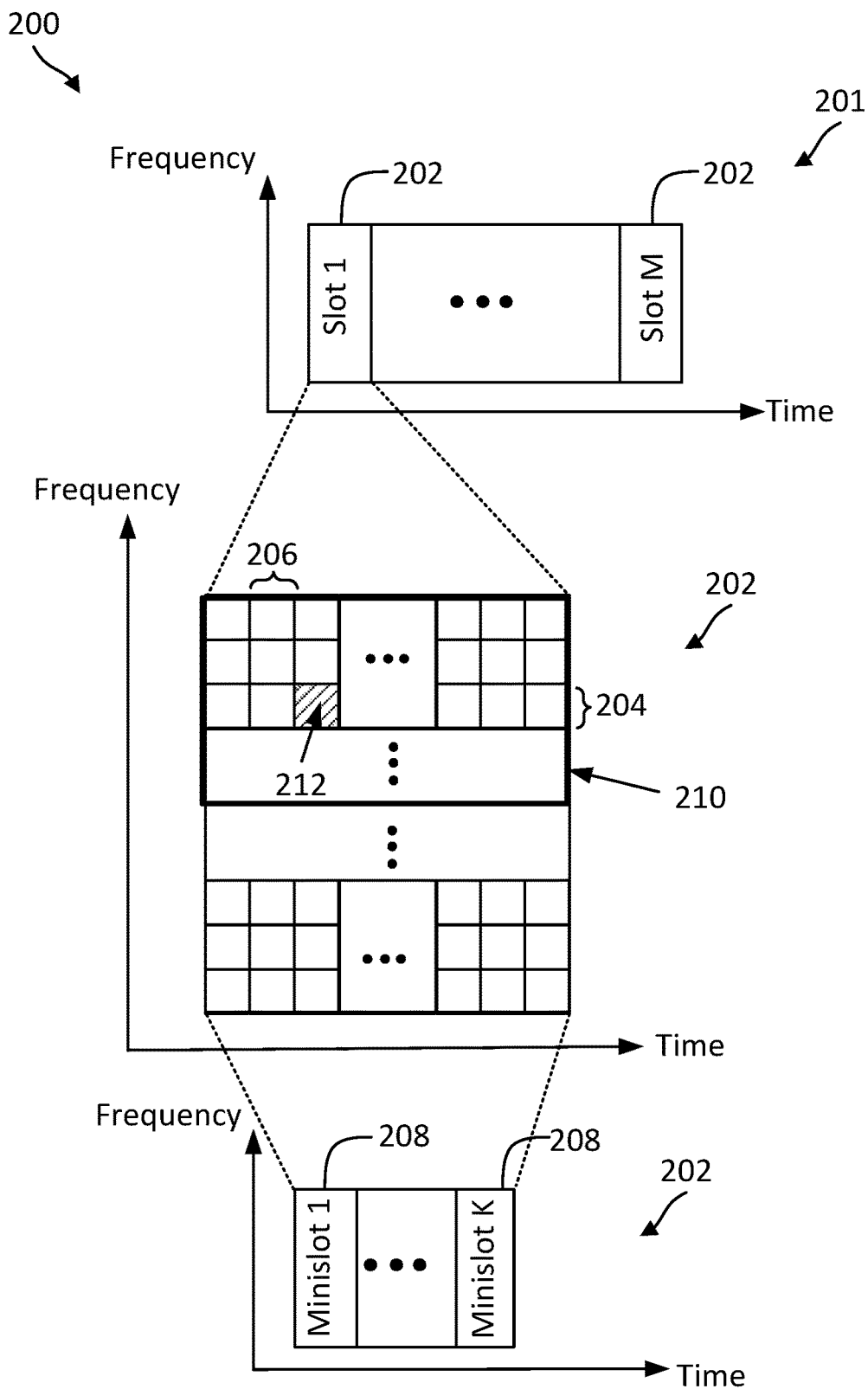
FIG. 2 illustrates a radio frame structure according to some aspects of the present disclosure.

FIG. 2 is a timing diagram illustrating a radio frame structure 200 according to some aspects of the present disclosure. The radio frame structure 200 may be employed by BSs such as the BSs 105 and UEs such as the UEs 115 in a network such as the network 100 for communications. In particular, the BS may communicate with the UE using time-frequency resources configured as shown in the radio frame structure 200. In FIG. 2, the x-axes represent time in some arbitrary units and the y-axes represent frequency in some arbitrary units. The transmission frame structure 200 includes a radio frame 201. The duration of the radio frame 201 may vary depending on the aspects. In an example, the radio frame 201 may have a duration of about ten milliseconds. The radio frame 201 includes M number of slots 202, where M may be any suitable positive integer. In an example, M may be about 10.

Each slot 202 includes a number of subcarriers 204 in frequency and a number of symbols 206 in time. The number of subcarriers 204 and/or the number of symbols 206 in a slot 202 may vary depending on the aspects, for example, based on the channel bandwidth, the subcarrier spacing (SCS), and/or the CP mode. One subcarrier 204 in frequency and one symbol 206 in time forms one resource element (RE) 212 for transmission. A resource block (RB) 210 is formed from a number of consecutive subcarriers 204 in frequency and a number of consecutive symbols 206 in time.

In an example, a BS (e.g., BS 105 in FIG. 1) may schedule a UE (e.g., UE 115 in FIG. 1) for UL and/or DL communications at a time-granularity of slots 202 or mini-slots 208. Each slot 202 may be time-partitioned into K number of mini-slots 208. Each mini-slot 208 may include one or more symbols 206. The mini-slots 208 in a slot 202 may have variable lengths. For example, when a slot 202 includes N number of symbols 206, a mini-slot 208 may have a length between one symbol 206 and (N−1) symbols 206. In some aspects, a mini-slot 208 may have a length of about two symbols 206, about four symbols 206, or about seven symbols 206. In some examples, the BS may schedule UE at a frequency-granularity of a resource block (RB) 210 (e.g., including about 12 subcarriers 204).

Figure 3:
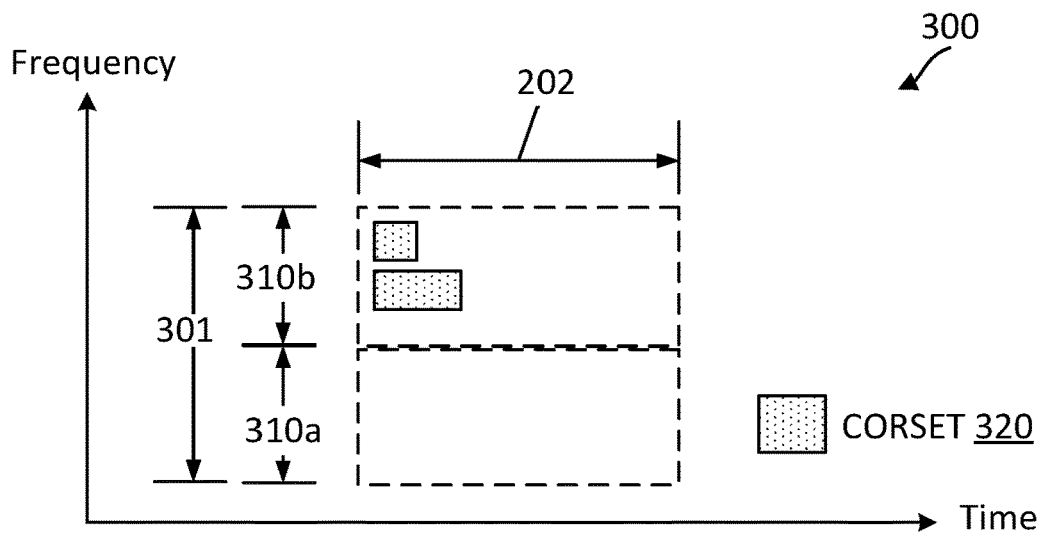
FIG. 3 illustrates a BWP configuration scheme according to some aspects of the present disclosure.
Figure 4:
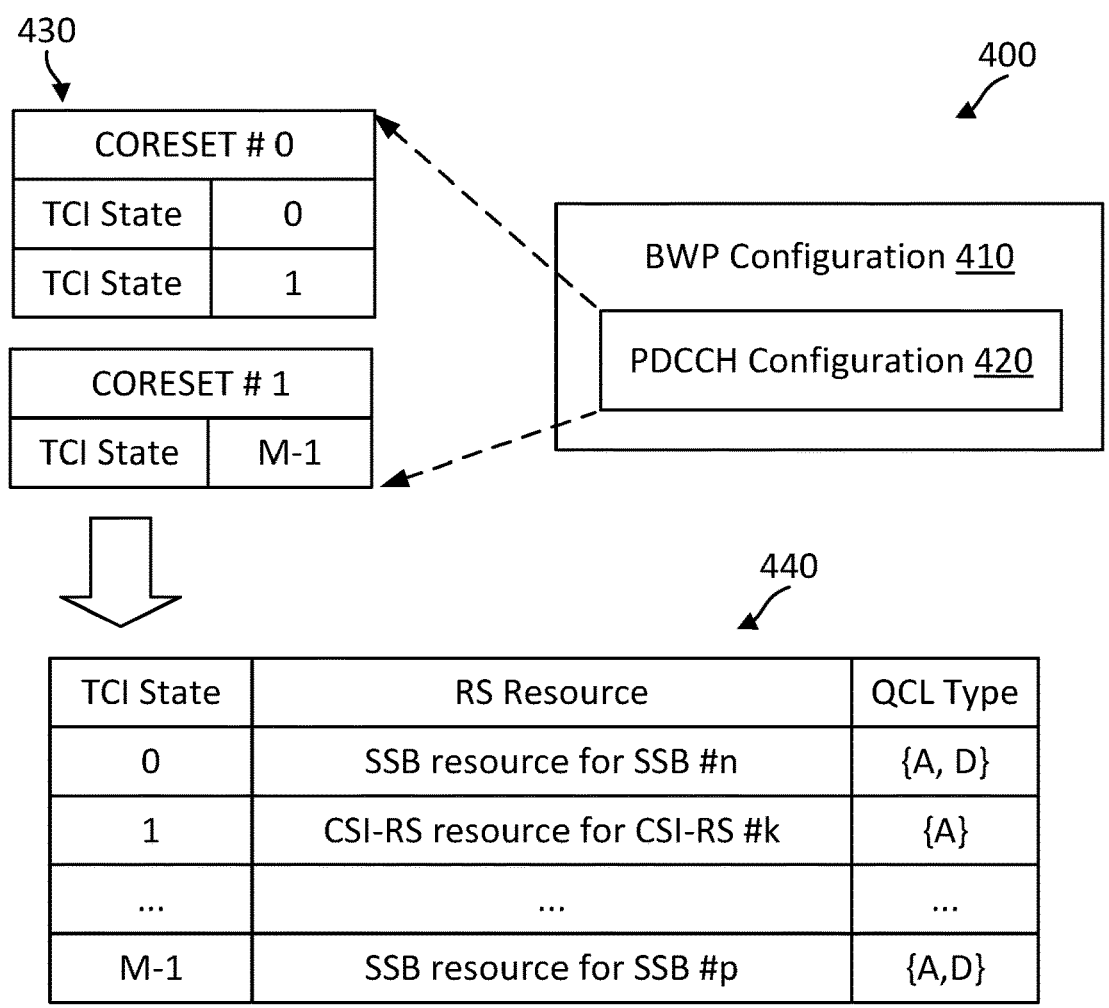
FIG. 4 illustrates a BWP configuration scheme according to some aspects of the present disclosure.

FIG. 3 is discussed in relation to FIG. 4 to illustrate BWP configuration mechanisms. FIG. 3 illustrates a BWP configuration scheme 300 according to some aspects of the present disclosure. The scheme 300 may be employed by BSs such as the BSs 105 and UEs such as the UEs 115 in a network such as the network 100. In particular, a BS (e.g., the BSs 105) may configure a UE (e.g., the UEs 115) with multiple BWPs as shown in the scheme 300. In FIG. 3, the x-axis represents time in some arbitrary units, and the y-axis represents frequency in some arbitrary units. In the scheme 300, the BS and the UE may operate in a channel over a frequency band 301. The frequency band 301 may be located at any frequency and may span any suitable frequency bandwidth. In some instances, the frequency band 301 may be a mmWave band and may include a wide bandwidth (e.g., about 40 MHz, 80 MHz, 100 MHz, 500 MHz or more). For simplicity of illustration and discussion, FIG. 3 illustrates the frequency band 301 partitioned into two BWPs 310 (shown as 310a and 310b). However, the frequency band 301 can be partitioned into any suitable BWPs 310. Additionally, the BWPs 310 can be non-overlapping as shown or partially overlapping.

In the illustrated example of FIG. 3, the BS configures the UE with two BWPs 310a and 310b. The BS may configure the UE with one or more CORESETs 320 in a BWP 310. Each CORESET 320 includes a set of physical time and frequency resources (e.g., a group of PRBs similar to the RBs 210) where PDCCH may be transmitted. For instance, the BS configures the UE with two CORESETs 320 in the BWP 310b. In some aspects, the BS may configure the BWP 310b as an active BWP for communication with the UE. In some aspects, the BS may configure the UE to operate in a dormancy mode in the BWP 310a, which may be referred to as a dormancy BWP. In some aspects, the BS may not configure any CORESET in the dormancy BWP 310a since the UE is not expected to perform PDCCH monitoring in the dormancy BWP 310a. In some aspects, the BS may configure the UE with a BWP configuration as shown in FIG. 4.

FIG. 4 illustrates a BWP configuration scheme 400 according to some aspects of the present disclosure. The scheme 400 may be employed by BSs such as the BSs 105 and UEs such as the UEs 115 in a network such as the network 100. In particular, a BS (e.g., the BSs 105) may configure a UE (e.g., the UEs 115) with a BWP configuration 410 as shown in the scheme 400. In some aspects, the BWP configuration 410 is an RRC configuration. The BS may indicate the BWP configuration 410 in the form of an RRC information element (IE) carried in an RRC message. The BWP configuration 410 may include various information, such as the frequency location, bandwidth, subcarrier spacing, and/or cyclic prefix, related to a BWP (e.g., the BWPs 310). The BWP configuration 410 may also include a PDCCH configuration 420 (e.g., an RRC message IE) for the respective BWP. The PDCCH configuration 420 may include various information, such as CORESETs and/or PDCCH search spaces, for PDCCH monitoring. In some aspects, the BS may configure the UE with up to about 3 CORESETs and about 10 PDCCH search space sets within a configured BWP. The search space set provides the UE with time domain parameter related to PDCCH monitoring, for example, when the UE may monitor for PDCCH in a certain CORESET. The search space set may include parameters such as aggregation levels and/or number of PDCCH candidates that the UE may use for performing blind decoding on the PDCCH.

In the illustrated example of FIG. 4, the PDCCH configuration 420 includes a CORESET configuration 430. The CORESET configuration 430 indicates a CORESET #0 and a CORESET #1, which may be similar to the CORESETs 320. The CORESET configuration 430 may include various information, such as resource information (including a start PRB index, a number of PRBs, a start symbol index, and/or a number of symbols) and/or TCI state information, for each CORESET. As shown, the CORESET #0 may include a TCI state 0 and a TCI state 1, and the CORESET #1 may include a TCI state M−1. The TCI state information may provide the UE with QCL information between PDCCHDMRSs and other references signals (e.g., SSBs, CSI-RSs, and/or TRSs).

In some aspects, the BS may configure the UE with a TCI state table 440. The UE may determine QCL information associated with a CORESET from the TCI state table 440. Each row in the TCI state table 440 provides references signal resource information and QCL type information for a certain TCI state. The references signal resource information may indicate the location of the time and/or frequency resources (e.g., symbols and/or subcarriers) where a BS may transmit a respective references signal. The QCL type information may indicate a QCL type A, a QCL type B, a QCL type C, and/or a QCL type D. QCL type A may refer to doppler spread, doppler shift, delay spread, and/or average delay channel characteristics. QCL type B may refer to doppler shift and doppler spread channel characteristics. QCL type C may refer to average delay and doppler shift channel characteristics. QCL type D may refer to spatial receive parameters. Thus, when TCI state 0 defines the source reference signal(s) for a certain physical signal or channel (e.g., PDCCH), the UE can configure its receive beam(s) in the same way it is configured for receiving the SSB with the index #n. Similarly, when TCI state 1 defines the source reference signal(s) for a certain physical signal or channel (e.g., PDCCH), the UE can configure its receive beam(s) in the same way it is configured for receiving the CSI-RS with the index #k. When TCI state M−1 defines the source reference signal(s) for a certain physical signal or channel (e.g., PDCCH), the UE can configure its receive beam(s) in the same way it is configured for receiving the SSB with the index #p.

As such, when the BS configures the UE to monitor BFD RSs that are spatially QCLed with a PDCCH DMRS in a BWP (e.g., the BWP 310), the UE may configure its receive beams for BFD RS monitoring based on the TCI state(s) indicated in the CORESET configuration 430. As an example, the CORESET #1 and CORESET #2 may correspond to the CORESETs 320 in the BWP 310a of FIG. 3. Thus, based on the CORESET configuration 430 and the TCI state table 440, the UE may perform BFD RS monitoring by monitoring SSB with index #n, CSI-RS with index #k, and SSB with index #p. The UE may determine whether a beam failure has occurred based on measurements performed on SSB with index #n, CSI-RS with index #k, and/or SSB with index #p.

As described above, the BS may not configure any CORESET in a dormancy BWP (e.g., the BWP 310b) since the UE is not expected to monitor for PDCCH in the dormancy BWP. For instance, the BS may configure an RRC configuration similar to the RRC configuration 410 for the dormancy BWP, but may not include a PDCCH configuration IE in the BWP configuration. Thus, the UE may be unable to determine which BFD RSs to monitor for the BFD.

Accordingly, the present application provides techniques for a UE to perform BFD RS monitoring while operating in a dormancy mode or dormancy BWP. For instance, a BS may configure the UE with various rules in determining which BFD RSs to monitor for BFD.

Figure 5:
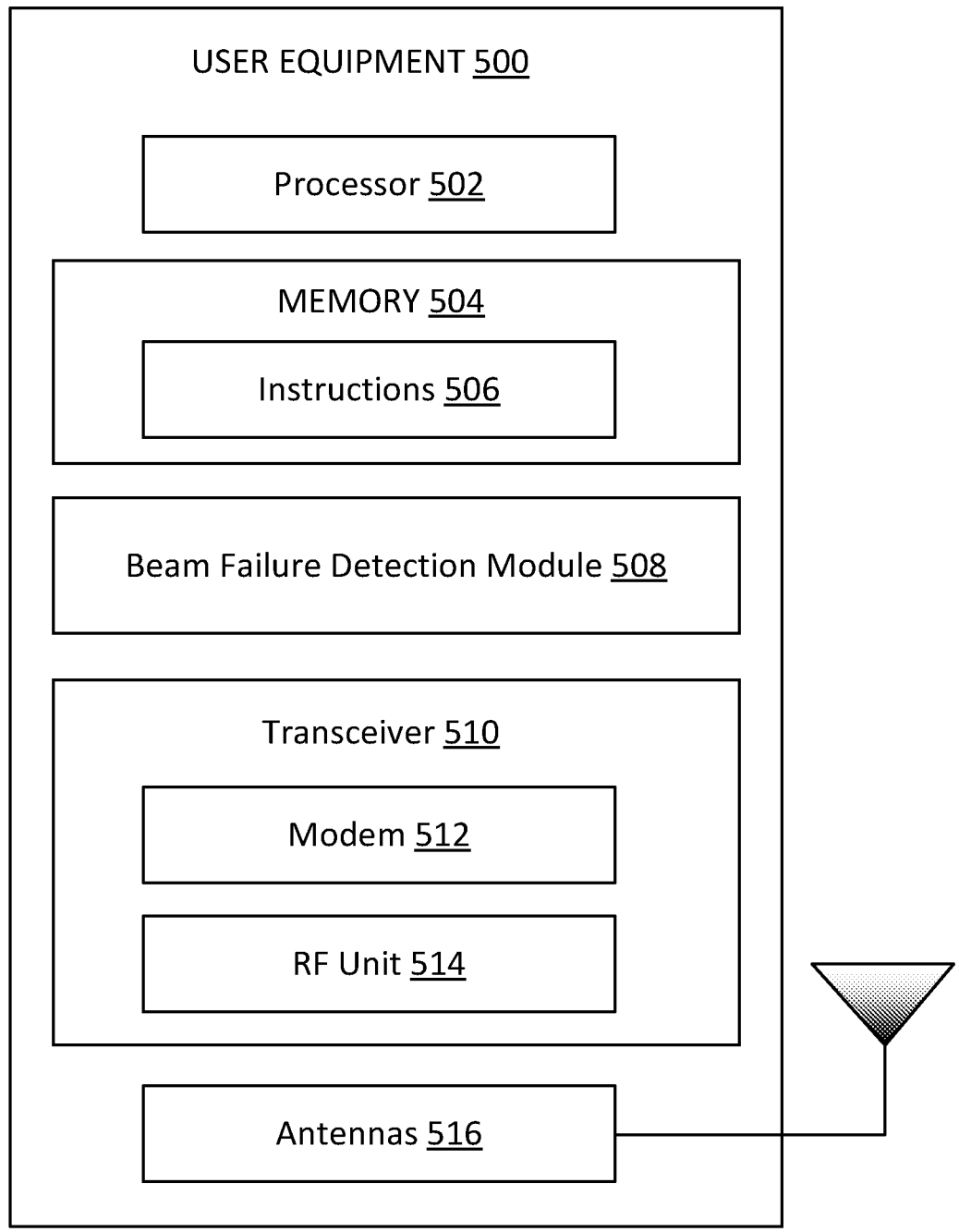
FIG. 5 is a block diagram of a user equipment (UE) according to some aspects of the present disclosure.

FIG. 5 is a block diagram of an exemplary UE 500 according to some aspects of the present disclosure. The UE 500 may be a UE 115 discussed above in FIG. 1. As shown, the UE 500 may include a processor 502, a memory 504, a BFD module 508, a transceiver 510 including a modem subsystem 512 and a radio frequency (RF) unit 514, and one or more antennas 516. These elements may be in direct or indirect communication with each other, for example via one or more buses.

The processor 502 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 504 includes a non-transitory computer-readable medium. The memory 504 may store, or have recorded thereon, instructions 506. The instructions 506 may include instructions that, when executed by the processor 502, cause the processor 502 to perform the operations described herein with reference to the UEs 115 in connection with aspects of the present disclosure, for example, aspects of FIGS. 1-4 and 7-13. Instructions 506 may also be referred to as program code. The program code may be for causing a wireless communication device to perform these operations, for example by causing one or more processors (such as processor 502) to control or command the wireless communication device to do so. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The BFD module 508 may be implemented via hardware, software, or combinations thereof. For example, the BFD module 508 may be implemented as a processor, circuit, and/or instructions 506 stored in the memory 504 and executed by the processor 502. In some instances, the BFD module 508 can be integrated within the modem subsystem 512. For example, the BFD module 508 can be implemented by a combination of software components (e.g., executed by a DSP or a general processor) and hardware components (e.g., logic gates and circuitry) within the modem sub system 512.

The BFD module 508 may be used for various aspects of the present disclosure, for example, aspects of FIGS. 1-4 and 7-13. For instance, the BFD module 508 is configured to determine to operate in a dormancy mode for a cell of a wireless communication network. The wireless communication network may be similar to the network 100. In some aspects, the cell of the network includes a secondary cell. In some aspects, the cell of the network includes a primary cell. In some aspects, the BFD module 508 may determine to operate in the dormancy mode based on a configuration or trigger received from a BS (e.g., the BSs 105, 600, and/or 702). The BFD module 508 is further configured to operate in the dormancy mode for the cell of the wireless communication network. The BFD module 508 is further configured to operate in the dormancy mode by performing a BFD in accordance with a BFD configuration.

In some aspects, the BFD module 508 is configured to perform the BFD by refraining from performing the BFD in a dormancy BWP (e.g., the BWP 310*a*). In some aspects, the BFD module 508 is configured to perform the BFD by monitoring for one or more BFD RSs in a dormancy BWP. In some aspects, the BFD module 508 is further configured to receive a CORESET configuration for the dormancy BWP and monitor for the one or more BFD RSs further based on the CORESET configuration for the dormancy BWP. In some aspects, the CORESET may include a zero number of PDCCH candidates per aggregation level and per search space.

In some aspects, the BFD module 508 is configured to perform the BFD by monitoring for one or more BFD RSs in a BWP when the BFD configuration explicitly indicates the one or more BFD RSs and refrain from performing the BFD when the BFD configuration fails to explicitly indicate the one or more BFD RSs. In some aspects, the BFD module 508 is configured to monitor for the one or more BFD RSs QCLed with a CORESET. When there are more than one QCL type for the CORESET, the BFD module 508 is configured to monitor the BFD RS with a type D quasi-colocation with the CORESET.

In some aspects, the BFD module 508 is configured to perform the BFD by monitoring for one or more BFD RSs in a BWP when the BFD configuration implicitly indicates the one or more BFD RSs and refrain from performing the BFD when the BFD configuration fails to implicitly indicate the one or more BFD RSs. In some aspects, the BFD module 508 is configured to monitor for the one or more BFD RSs associated with a TCI state of a CORESET. When there are more than one TCI states for he CORESET, the BFD module 508 is configured to monitor the BFD RS in a TCI state with a type D quasi-colocation with the CORESET.

In some aspects, the BFD module 508 is configured to perform the BFD by at least one of monitoring for one or more explicit BFD RSs in a BWP when the BFD configuration explicitly indicates the one or more explicit BFD RSs; or monitoring for one or more implicit BFD RSs in the BWP when the BFD configuration fails to explicitly indicate the one or more explicit BFD RSs.

In some aspects, the BFD module 508 is configured to perform the BFD by monitoring for one or more BFD RSs in a BWP, wherein the BWP includes a BWP utilized by the UE 500 before operating in the dormancy mode.

In some aspects, the BFD module 508 is configured to perform the BFD by monitoring for one or more BFD RSs in a BWP, where the BWP includes a first BWP utilized by the UE 500 before operating in the dormancy mode and a dormancy BWP utilized by the UE 500 when operating in the dormancy mode.

In some aspects, the BFD module 508 is configured to perform the BFD by monitoring for one or more BFD RSs fully within a dormancy BWP. In some other aspects, the BFD module 508 is configured to perform the BFD by monitoring for one or more BFD RSs partially within a dormancy BWP, where a first portion of each of the one or more BFD RSs is within the dormancy BWP and a second portion of each of the one or more BFD RSs is outside the dormancy BWP. In some aspects, the BFD module 508 is configured to perform the BFD by measuring at least one parameter of the first portion of each of the one or more BFD RSs. In some aspects, the BFD module 508 is configured to perform the BFD by measuring at least one parameter of each of the one or more BFD RSs based on the first and second portions. In some aspects, the BFD module 508 is configured to perform the BFD by refraining from monitoring for one or more BFD RSs outside of a dormancy BWP. In yet other aspects, the performing the BFD at block 1320 may include monitoring for one or more BFD RSs outside of a dormancy BWP.

In some aspects, the BFD module 508 is further configured to receive the BFD configuration. In some aspects, the BFD module 508 is further configured to receive the BFD configuration via at least one of DCI, a MAC-CE, or a WUS. In some aspects, the BFD configuration indicates a first BWP is associated with the dormancy mode and a second BWP is associated with a non-dormancy mode. In some aspects, the BFD configuration has a first duration. In some aspects, the first duration is permanent. In some aspects, the first duration is based on at least one of a timer or a predetermined value. In some aspects, the first duration is based on a number of transitions between the dormancy mode and the non-dormancy mode. Mechanisms for performing BFD monitoring and measurements when operating in a dormancy BWP are described in greater detail herein.

As shown, the transceiver 510 may include the modem subsystem 512 and the RF unit 514. The transceiver 510 can be configured to communicate bi-directionally with other devices, such as the BSs 105. The modem subsystem 512 may be configured to modulate and/or encode the data from the memory 504 and/or the BFD module 508 according to a modulation and coding scheme (MCS), e.g., a low-density parity check (LDPC) coding scheme, a turbo coding scheme, a convolutional coding scheme, a polar coding scheme, a digital beamforming scheme, etc. The RF unit 514 may be configured to process (e.g., perform analog to digital conversion or digital to analog conversion, etc.) modulated/encoded data (e.g., PUSCH, PUCCH, beam measurements, beam failure indication) from the modem subsystem 512 (on outbound transmissions) or of transmissions originating from another source such as a UE 115 or a BS 105. The RF unit 514 may be further configured to perform analog beamforming in conjunction with the digital beamforming. Although shown as integrated together in transceiver 510, the modem subsystem 512 and the RF unit 514 may be separate devices that are coupled together at the UE 115 to enable the UE 115 to communicate with other devices.

The RF unit 514 may provide the modulated and/or processed data, e.g. data packets (or, more generally, data messages that may contain one or more data packets and other information), to the antennas 516 for transmission to one or more other devices. The antennas 516 may further receive data messages transmitted from other devices. The antennas 516 may provide the received data messages for processing and/or demodulation at the transceiver 510. The transceiver 510 may provide the demodulated and decoded data (e.g., PDCCH, PDSCH, BFD configuration, BWP configuration, BWP activation, BWP state transition trigger, WUS, BFD RSs, SSBs, CSI-RSs, TRSs) to the BFD module 508 for processing. The antennas 516 may include multiple antennas of similar or different designs in order to sustain multiple transmission links. The RF unit 514 may configure the antennas 516.

In an aspect, the UE 500 can include multiple transceivers 510 implementing different RATs (e.g., NR and LTE). In an aspect, the UE 500 can include a single transceiver 510 implementing multiple RATs (e.g., NR and LTE). In an aspect, the transceiver 510 can include various components, where different combinations of components can implement different RATs.

Figure 6:
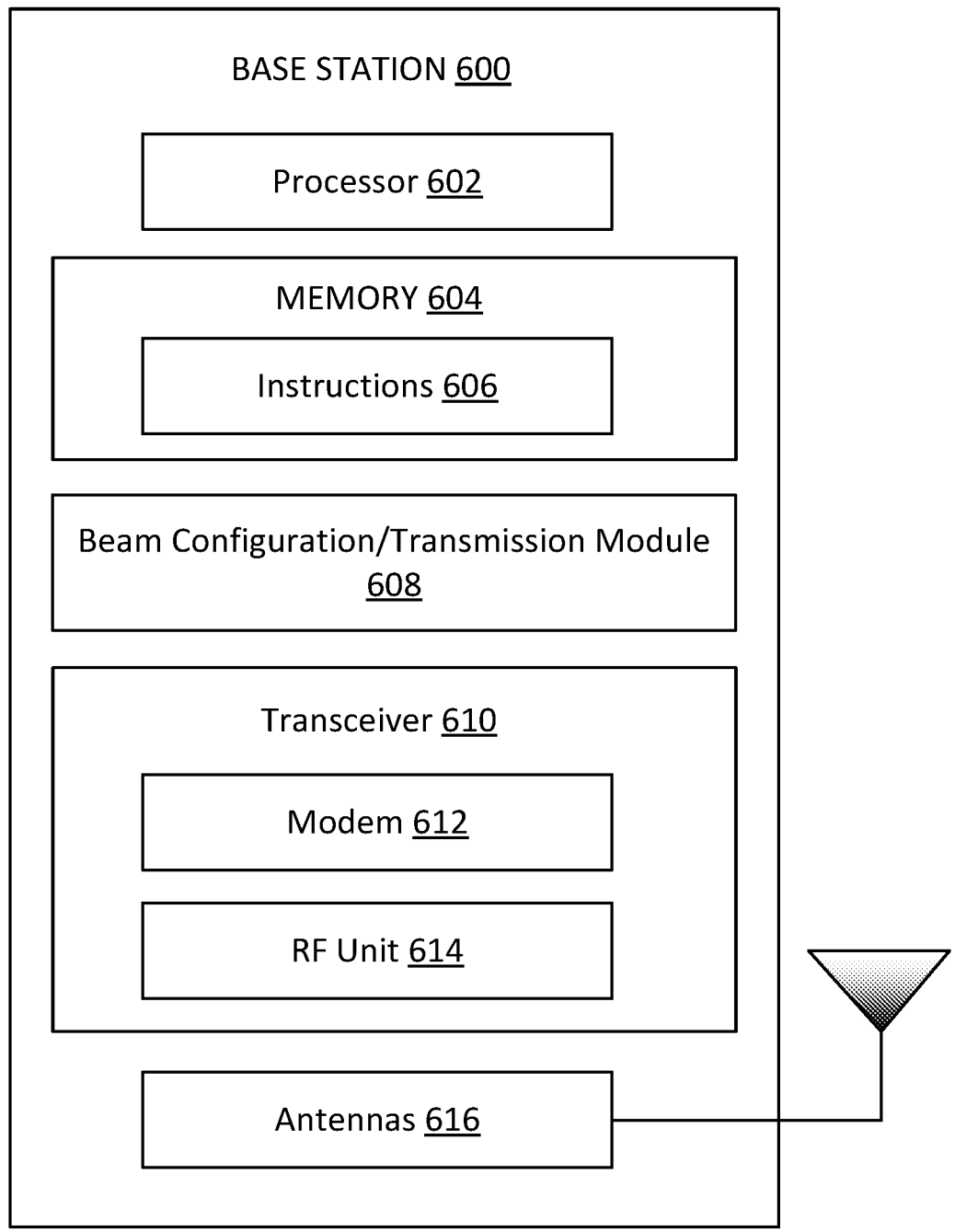
FIG. 6 is a block diagram of an exemplary base station (BS) according to some aspects of the present disclosure.

FIG. 6 is a block diagram of an exemplary BS 600 according to some aspects of the present disclosure. The BS 600 may be a BS 105 in the network 100 as discussed above in FIG. 1. As shown, the BS 600 may include a processor 602, a memory 604, a beam configuration/transmission module 608, a transceiver 610 including a modem subsystem 612 and a RF unit 614, and one or more antennas 616. These elements may be in direct or indirect communication with each other, for example via one or more buses.

The processor 602 may have various features as a specific-type processor. For example, these may include a CPU, a DSP, an ASIC, a controller, a FPGA device, another hardware device, a firmware device, or any combination thereof configured to perform the operations described herein. The processor 602 may also be implemented as a combination of computing devices, e.g., a combination of a DSP and a microprocessor, a plurality of microprocessors, one or more microprocessors in conjunction with a DSP core, or any other such configuration.

The memory 604 may include a cache memory (e.g., a cache memory of the processor 602), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 604 may include a non-transitory computer-readable medium. The memory 604 may store instructions 606. The instructions 606 may include instructions that, when executed by the processor 602, cause the processor 602 to perform operations described herein, for example, aspects of FIGS. 1-4, 7-12, and 14. Instructions 606 may also be referred to as code, which may be interpreted broadly to include any type of computer-readable statement(s) as discussed above with respect to FIG. 5.

The beam configuration/transmission module 608 may be implemented via hardware, software, or combinations thereof. For example, the beam configuration/transmission module 608 may be implemented as a processor, circuit, and/or instructions 606 stored in the memory 604 and executed by the processor 602. In some instances, the beam configuration/transmission module 608 can be integrated within the modem subsystem 612. For example, the beam configuration/transmission module 608 can be implemented by a combination of software components (e.g., executed by a DSP or a general processor) and hardware components (e.g., logic gates and circuitry) within the modem subsystem 612.

The beam configuration/transmission module 608 may be used for various aspects of the present disclosure, for example, aspects of FIGS. 1-4, 7-12, and 14. For instance, the beam configuration/transmission module 608 is configured to determines that a UE (e.g., the UEs 115 and/or 500) is operating in a dormancy mode for a cell of a wireless communication network. The wireless communication network may be similar to the network 100. In some aspects, the cell of the network includes a secondary cell. In some aspects, the cell of the network includes a primary cell. In some aspects, the beam configuration/transmission module 608 is configured to determine that the UE is operating in the dormancy mode based on a configuration or a trigger transmitted by the beam configuration/transmission module 608. The beam configuration/transmission module 608 is also configured to transmit, in response to determining the UE is operating in the dormancy mode, one or more BFD RSs in accordance with a BFD configuration.

In some aspects, the beam configuration/transmission module 608 is configured to transmit the BFD RSs by transmitting the one or more BFD RSs in a dormancy BWP (e.g., the BWP 310a). In some aspects, the beam configuration/transmission module 608 is configured to transmit a CORESET configuration for the dormancy BWP and transmit the one or mode BFD RSs based on the CORESET configuration for the dormancy BWP.

In some aspects, the beam configuration/transmission module 608 is configured to transmit, to the UE, the BFD configuration. In some aspects, the BFD configuration explicitly indicates the one or more BFD RSs. In some aspects, the BFD configuration implicitly indicates the one or more BFD RSs. In some aspects, the configuration/transmission module 608 is configured to transmit the BFD configuration via at least one of DCI, MAC-CE or a WUS.

In some aspects, the beam configuration/transmission module 608 is configured to transmit the one or more BFD RSs by transmitting the one or more BFD RSs QCLed with a CORESET. In some aspects, the beam configuration/transmission module 608 is configured to transmit the one or more BFD RSs by transmitting the one or more BFD RSs based on a TCI state of a CORESET.

In some aspects, the beam configuration/transmission module 608 is configured to transmit the one or more BFD RSs by transmitting the one or more BFD RSs in a BWP, where the BWP includes a BWP utilized by the UE before operating in the dormancy mode.

In some aspects, the beam configuration/transmission module 608 is configured to transmit the one or more BFD RSs by transmitting the one or more BFD RSs in a BWP, where the BWP includes a BWP utilized by the UE before operating in the dormancy mode and a dormancy BWP utilized by the UE when operating in the dormancy mode.

In some aspects, the beam configuration/transmission module 608 is configured to transmit the one or more BFD RSs by transmitting the one or more BFD RSs fully within a dormancy BWP. In some aspects, the beam configuration/transmission module 608 is configured to transmit the one or more BFD RSs by transmitting the one or more BFD RSs partially within a dormancy BWP, where a first portion of each of the one or more BFD RSs is within the dormancy BWP and a second portion of each of the one or more BFD RSs is outside the dormancy BWP. In some aspects, the beam configuration/transmission module 608 is configured to transmit the one or more BFD RSs by transmitting the one or more BFD RSs outside of a dormancy BWP.

In some aspects, the BFD configuration indicates a first BWP is associated with the dormancy mode and a second BWP is associated with a non-dormancy mode. In some aspects, the BFD configuration has a first duration. In some aspects, the first duration is permanent. In some aspects, the first duration is based on at least one of a timer or a predetermined value. In some aspects, the first duration is based on a number of transitions between the dormancy mode and the non-dormancy mode. Mechanisms for facilitating BFD RS monitoring and measurements for FD at a UE when the UE operates in a dormancy BWP are described in greater detail herein.

As shown, the transceiver 610 may include the modem subsystem 612 and the RF unit 614. The transceiver 610 can be configured to communicate bi-directionally with other devices, such as the UEs 115 and/or 500 and/or another core network element. The modem subsystem 612 may be configured to modulate and/or encode data according to a MCS, e.g., a LDPC coding scheme, a turbo coding scheme, a convolutional coding scheme, a polar coding scheme, a digital beamforming scheme, etc. The RF unit 614 may be configured to process (e.g., perform analog to digital conversion or digital to analog conversion, etc.) modulated/encoded data (e.g., PDCCH, PDSCH, BFD configuration, BWP configuration, BWP activation, BWP state transition trigger, WUS, BFD RSs, SSBs, CSI-RSs, TRSs) from the modem subsystem 612 (on outbound transmissions) or of transmissions originating from another source such as a UE 115 and/or UE 500. The RF unit 614 may be further configured to perform analog beamforming in conjunction with the digital beamforming. Although shown as integrated together in transceiver 610, the modem subsystem 612 and/or the RF unit 614 may be separate devices that are coupled together at the BS 105 to enable the BS 105 to communicate with other devices.

The RF unit 614 may provide the modulated and/or processed data, e.g. data packets (or, more generally, data messages that may contain one or more data packets and other information), to the antennas 616 for transmission to one or more other devices. This may include, for example, transmission of information to complete attachment to a network and communication with a camped UE 115 or 500 according to some aspects of the present disclosure. The antennas 616 may further receive data messages transmitted from other devices and provide the received data messages for processing and/or demodulation at the transceiver 610. The transceiver 610 may provide the demodulated and decoded data (e.g., PUSCH, PUCCH, beam measurements, beam failure indication) to the beam configuration/transmission module 608 for processing. The antennas 616 may include multiple antennas of similar or different designs in order to sustain multiple transmission links.

In an aspect, the BS 600 can include multiple transceivers 610 implementing different RATs (e.g., NR and LIE). In an aspect, the BS 600 can include a single transceiver 610 implementing multiple RATs (e.g., NR and LIE). In an aspect, the transceiver 610 can include various components, where different combinations of components can implement different RATs.

Figure 7:
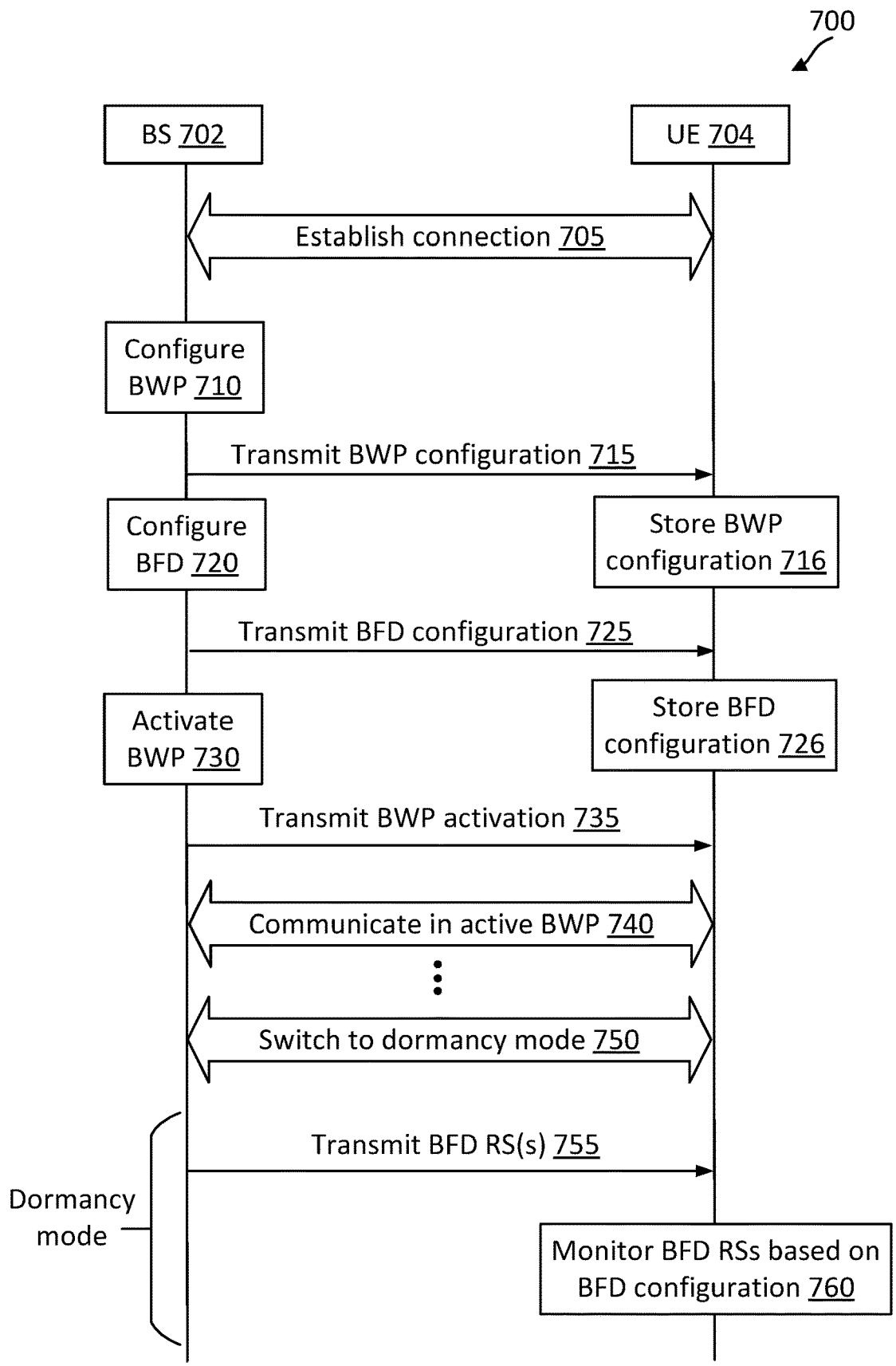
FIG. 7 is a signaling diagram of a BFD method according to some aspects of the present disclosure.

FIG. 7 is a signaling diagram of a BFD method 700 according to some aspects of the present disclosure. The method 700 may be implemented between a BS (e.g., BSs 105 and/or 600) and a UE (e.g., UEs 115 and/or 500). The BS may utilize one or more components, such as the processor 602, the memory 604, the beam configuration/transmission module 608, the transceiver 610, the modem 612, and the one or more antennas 616, to implement aspects of the method 700. The UE may utilize one or more components, such as the processor 502, the memory 504, the BFD module 508, the transceiver 510, the modem 512, and the one or more antennas 516, to implement aspects of the method 700. The method 700 may employ similar mechanisms as in the schemes 300 and 400 described above with respect to FIGS. 3 and 4, respectively. As illustrated, the method 700 includes a number of enumerated steps, but embodiments of the method 700 may include additional steps before, after, and in between the enumerated steps. In some aspects, one or more of the enumerated steps may be omitted or performed in a different order.

At action 705, a BS 702 (e.g., the BSs 105 and/or 600) and a UE 704 (e.g., the UEs 115 and/or 500) establish a connection for communications. The connection may be established using techniques, such as random access and RRC connection setup procedures discussed above with respect to FIG. 1. In some instances, the connection may include two or more component carriers (CCs) operating in a carrier aggregation mode. For instance, the connection may include a primary cell (PCell) and a secondary cell (SCell). In some aspects, the UE may utilize one or more components, such as the processor 502, the memory 504, the BFD module 508, the transceiver 510, the modem 512, and the one or more antennas 516, to establish the connection with the BS. The BS may utilize one or more components, such as the processor 602, the memory 604, the beam configuration/transmission module 608, the transceiver 610, the modem 612, and the one or more antennas 616, to establish the connection with the UE.

At action 710, the BS 702 configures BWPs (e.g., the BWPs 310) for the connection. In some instances, the BS 702 may configure up to about 4 BWPs for the connection. When there are multiple CCs associated with the connection, the BS 702 may configure one or more BWPs for each CC. In some aspects, the BS 702 may configure the UE 704 with BWPs based on the UE 704's capabilities. In some aspects, the BS may utilize one or more components, such as the processor 602, the memory 604, the beam configuration/transmission module 608, the transceiver 610, the modem 612, and the one or more antennas 616, to configure BWPs.

At action 715, the BS 702 transmits a BWP configuration to the UE 704. The BWP configuration may be similar to the BWP configuration 410. In some aspects, the BS may utilize one or more components, such as the processor 602, the memory 604, the beam configuration/transmission module 608, the transceiver 610, the modem 612, and the one or more antennas 616, to transmit the BWP configuration.

At action 716, upon receiving the BWP configuration, the UE 704 stores information associated with the BWP configuration in a memory (e.g., the memory 504) of the UE.

At action 720, the BS 702 configures a BFD configuration. The BFD configuration may include various rules for determining which reference signals the UE 704 may use for BFD RS monitoring and/or how BFD RSs can be measured when the UE operates in a dormancy BWP. In some aspects, the BS 702 may configure the UE 704 not perform BFD in the dormancy BWP. In some aspects, the BS 702 may configure UE 704 monitor BFD RSs based on an explicit BFD RS configuration and/or an implicit BFD RS configuration for a particular BWP. In some aspects, the particular BWP may be a non-dormancy BWP before the UE 704 switches to the dormancy BWP. In some aspects, the particular BWP may be a non-dormancy BWP paired with the dormancy BWP. In some aspects, the particular BWP may correspond to the dormancy BWP with a CORESET configured with a zero number of PDCCH candidates. In some aspects, the BS may utilize one or more components, such as the processor 602, the memory 604, the beam configuration/transmission module 608, the transceiver 610, the modem 612, and the one or more antennas 616, to configure the BFD configuration. Mechanisms for determining BFD RSs for BFD will be described more fully below in FIGS. 8-11.

At action 725, the BS 702 transmits the BFD configuration to the UE 704. In some aspects, the BS may utilize one or more components, such as the processor 602, the memory 604, the beam configuration/transmission module 608, the transceiver 610, the modem 612, and the one or more antennas 616, to transmit the BFD configuration.

At action 726, upon receiving the BFD configuration, the UE 704 stores information (e.g., rules for BFD RS monitoring) related to the BFD configuration in the memory.

At action 730, the BS 702 determines to activate one of configured BWPs. In some aspects, the BS may utilize one or more components, such as the processor 602, the memory 604, the beam configuration/transmission module 608, the transceiver 610, the modem 612, and the one or more antennas 616, to determine to activate a configured BWP.

At action 735, the BS 702 transmits a BWP activation to the UE 704 to activate the determined BWP. In some aspects, the BS may utilize one or more components, such as the processor 602, the memory 604, the beam configuration/transmission module 608, the transceiver 610, the modem 612, and the one or more antennas 616, to transmit the BWP activation.

At action 740, after the BWP activation, the BS 702 communicates with the UE 704 in the active BWP. The communications may include PDCCH, PDSCH, PUSCH, and/or PUCCH signals. In some aspects, the BS may utilize one or more components, such as the processor 602, the memory 604, the beam configuration/transmission module 608, the transceiver 610, the modem 612, and the one or more antennas 616, to communicate with the UE in the active BWP. The UE may utilize one or more components, such as the processor 502, the memory 504, the BFD module 508, the transceiver 510, the modem 512, and the one or more antennas 516, to communicate with the BS in the active BWP.

At action 750, the BS 702 switches the UE 704 to operate in a dormancy mode. In some aspects, the BS may utilize one or more components, such as the processor 602, the memory 604, the beam configuration/transmission module 608, the transceiver 610, the modem 612, and the one or more antennas 616, to switch the UE 704 to operate in the dormancy mode. In some aspects, the BS 702 may configure the UE 704 to operate in the dormancy BWP via an RRC configuration, downlink control information (DCI) signaling (e.g., in a PDCCH), medium access control-control element (MAC-CE) signaling, and/or a wakeup signal (WUS) as will be discussed more fully below.

At action 755, when the UE 704 operates in the dormancy BWP, the BS 702 transmits BFD RSs according to the rules in the BFD configuration to facilitate BFD at the UE 704. In some aspects, the BS may utilize one or more components, such as the processor 602, the memory 604, the beam configuration/transmission module 608, the transceiver 610, the modem 612, and the one or more antennas 616, to transmit BFD RSs to the UE based on the BFD configuration.

At action 760, the UE 704 performs BFD RS monitoring based on the rules in the BFD configuration. In some aspects, the UE may utilize one or more components, such as the processor 502, the memory 504, the BFD module 508, the transceiver 510, the modem 512, and the one or more antennas 516, to retrieve the BFD rules from the memory and monitor for BFD RS for BFD based on the rules indicated by the BFD configuration.

FIGS. 8-11 illustrate various mechanisms for a BS (e.g., the BSs 105, 600, and/or 702) to configure a UE (e.g. the UEs 115, 500, and/or 704) for BFD RS monitoring when the UE operates in a dormancy BWP (e.g., the BWP 310*a*).

Figure 8:
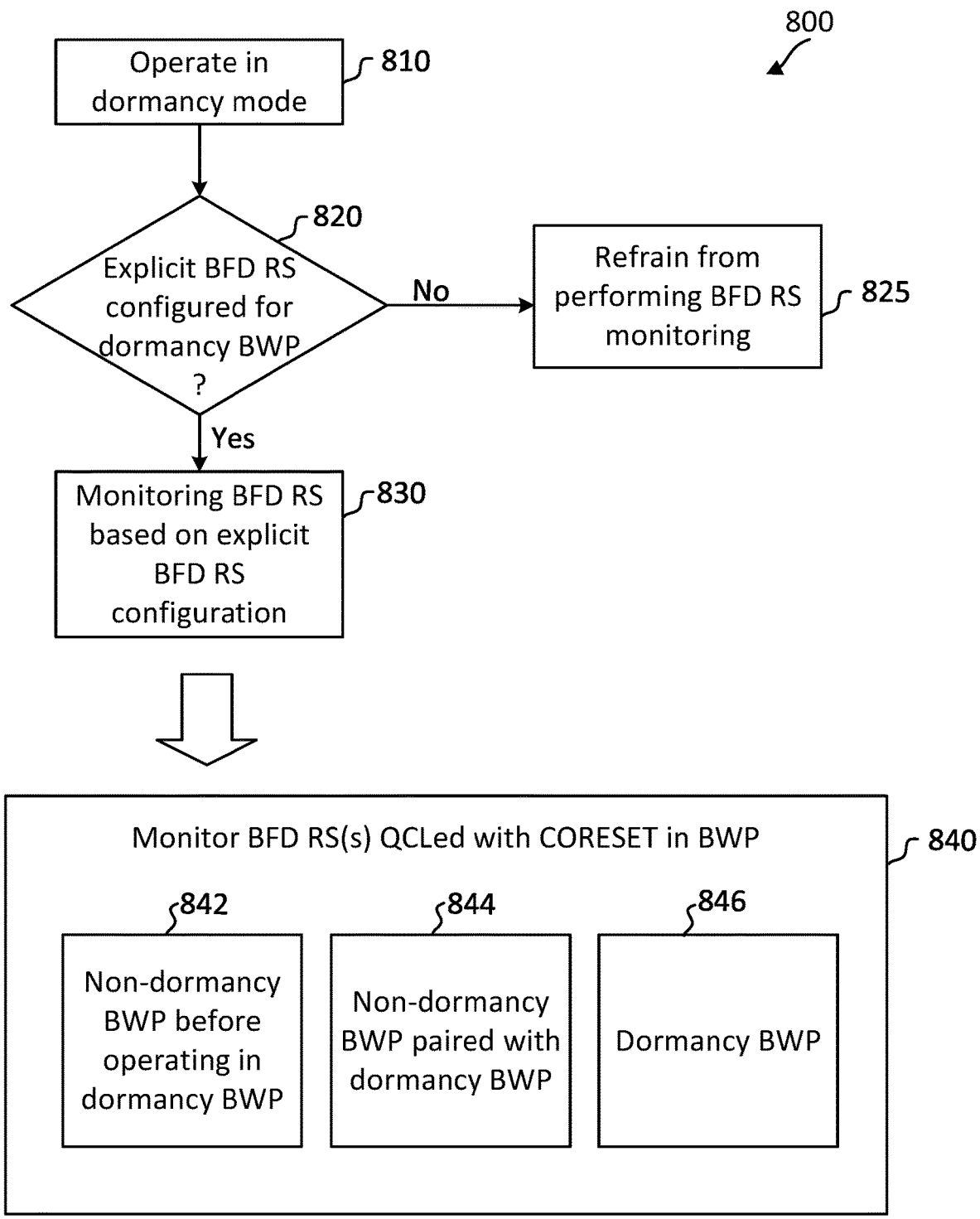
FIG. 8 is a flow diagram of a BFD method according to some aspects of the present disclosure.

FIG. 8 is a flow diagram of a BFD method 800 according to some aspects of the present disclosure. Aspects of the method 800 can be executed by a computing device (e.g., a processor, processing circuit, and/or other suitable component) of a wireless communication device or other suitable means for performing the steps. For example, a wireless communication device, such as the UEs 115, 500, and/or 702 may utilize one or more components, such as the processor 502, the memory 504, the BFD module 508, the transceiver 510, the modem 512, and the one or more antennas 516, to execute the steps of method 800. The method 800 may employ similar mechanisms as in the schemes 300 and 400 discussed above with reference to FIGS. 3 and 4, respectively. As illustrated, the method 800 includes a number of enumerated steps, but aspects of the method 800 may include additional steps before, after, and in between the enumerated steps. In some aspects, one or more of the enumerated steps may be omitted or performed in a different order.

In the method 800, a BS (e.g., the BSs 105, 600, and/or 702) may configure a UE (e.g., the UEs 115, 500, and/or 704) to perform BFD in a dormancy BWP (e.g., the BWP 310a). The BS may configure the UE to perform BFD if the UE is configured with explicit BFD RSs for the dormancy BWP. Otherwise, the UE may not perform BFD in the dormancy BWP. An explicit BFD RS configuration may indicate resources (in frequency and time) where the BS may transmit reference signals that the UE may monitor for BFD.

At block 810, the UE operates in a dormancy mode for a cell of a wireless communication network. The network may be similar to the network 100. In some aspects, the cell may be a PCell. In some aspects, the cell may be a SCell. The UE may determine to operate in the dormancy mode in the dormancy BWP based on a configuration from a BS. In some aspects, the UE may utilize one or more components, such as the processor 502, the memory 504, the BFD module 508, the transceiver 510, the modem 512, and the one or more antennas 516, to operate in the dormancy mode, for example, for power saving. The UE may configure at least one some of the RF components in the transceiver 510 to operate at a low-power state or power down state.

At block 820, the UE determines whether the UE is configured with explicit BFD RSs for the dormancy BWP. For instance, an explicit BFD RS configuration may include a list of one or more resources (in frequency and time) where the BS may transmit reference signals (e.g., SSBs, CSI-RSs, and/or TRSs) and the reference signals can be used for BFD. In some aspects, the UE may utilize one or more components, such as the processor 502, the memory 504, the BFD module 508, the transceiver 510, the modem 512, and the one or more antennas 516, to determine whether the UE is configured with explicit BFD RSs for the dormancy BWP. If the UE determines that no explicit BFD RSs are configured for the dormancy BWP, the UE may proceed to block 825.

At block 825, the UE refrains from performing BFD RS monitoring. In some aspects, the UE may utilize one or more components, such as the processor 502, the memory 504, the BFD module 508, the transceiver 510, the modem 512, and the one or more antennas 516, to disable BFD RS monitoring operations at the UE.

Returning to block 820, if the UE determines that the UE is configured with explicit BFD RSs for the dormancy BWP, the UE may proceed to block 830. At block 830, the UE monitors for the BFD RS(s) according to the explicit BFD RS configuration. In some aspects, the UE may utilize one or more components, such as the processor 502, the memory 504, the BFD module 508, the transceiver 510, the modem 512, and the one or more antennas 516, to perform BFD RS monitoring according to the BFD RSs in the explicit BFD RS configuration. The UE may configure the transceiver 510 and/or the one or more antennas 516 to monitor for a BFD RS in a certain spatial direction according to spatial parameters (e.g., QCL parameters) associated with the BFD RS.

When the UE is configured with explicit BFD RS(s), the UE may monitor and measure BFD RS(s) that are QCLed with CORESET(s) (e.g., the CORESETs 320) in a particular BWP as shown by the block 840. In some aspects, the particular BWP may correspond to a non-dormancy BWP before the UE operates in the dormancy BWP as shown by the block 842. As an example, the non-dormancy BWP may be configured with a CORESET similar to the CORESET #0 shown in the CORESET configuration 430 of FIG. 4. The UE may look up a TCI state (e.g., the TCI state 0 for CORESET #0) from the CORESET configuration 430 and look up a reference signal (e.g., the SSB index #n) indicated by the TCI state in the TCI state table 440. The UE may monitor an explicitly configured BFD RS that is QCLed with the SSB index #n indicated by the TCI state 0. Additionally or alternatively, UE may perform similar look up for the TCI state 1 of the CORESET #0 and monitor an explicitly configured BFD RS that is QCLed with the CSI-RS index #k indicated by the TCI state 1. In some aspects, when there are more than one QCL type for a CORESET, the UE may select a configured BFD RS that is QCLed with the CORESET in type D. Thus, referring to the same example, the UE may monitor a configured BFD RS that is QCLed with the SSB index #n indicated by the TCI state 0 based on the QCL type D indication for the SSB index #n. Accordingly, the BS may transmit one or more BFD RSs (e.g., SSBs, CSI-RSs, and/or TRSs) in accordance with the QCL relationship indicated by the CORESET in the non-dormancy BWP before the UE switches to the dormancy BWP.

In some other aspects, the particular BWP may correspond to a non-dormancy BWP paired with the dormancy BWP as shown by the block 844. Referring to the example illustrated in FIG. 3, the BS may configure the non-dormancy BWP 310b paired with the dormancy BWP 310a. Thus, for BFD, the UE may monitor reference signals that are QCLed with the CORESETs 320 in the BWP 310b. The UE may determine the BFD RSs for monitoring using substantially similar mechanisms as described for block 842. The BS may transmit one or more BFD RSs (e.g., SSBs, CSI-RSs, and/or TRSs) in accordance with the QCL relationship indicated by the CORESET in the paired non-dormancy BWP.

In yet other aspects, the particular BWP may correspond to the dormancy BWP as shown by the block 846. For instance, the BS may configure a CORESET for the dormancy BWP so that the UE may utilize QCL relationship configured for the CORESET to determine BFD RSs for monitoring. However, the BS may configure the CORESET with zero number of PDCCH candidates per aggregation level and per search space so that the UE may not perform PDCCH monitoring in the dormancy BWP. The BS may transmit one or more BFD RSs (e.g., SSBs, CSI-RSs, and/or TRSs) in accordance with the QCL relationship indicated by the CORESET in the dormancy BWP.

Figure 9:
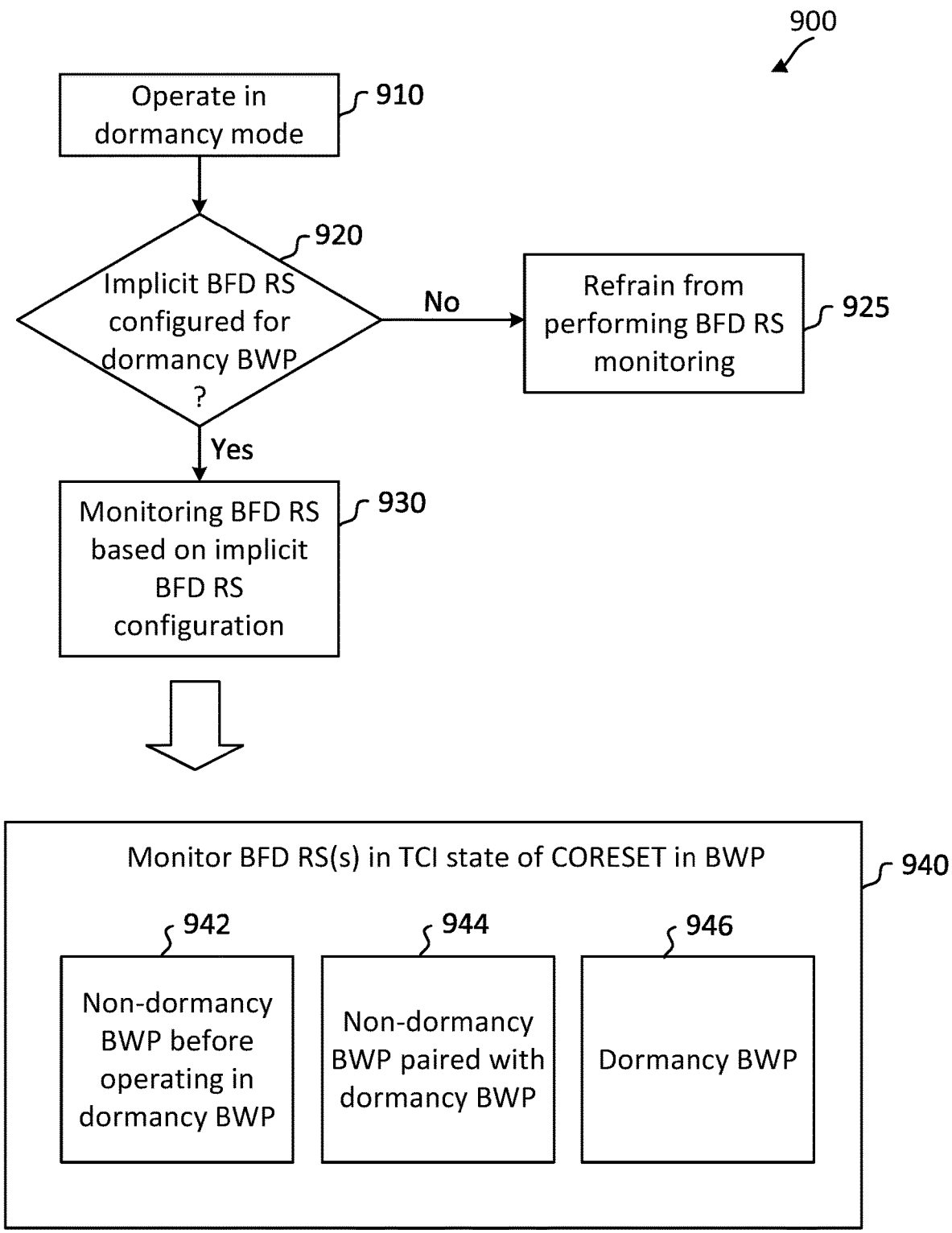
FIG. 9 is a flow diagram of a BFD method according to some aspects of the present disclosure.

FIG. 9 is a flow diagram of a BFD method 900 according to some aspects of the present disclosure. Aspects of the method 900 can be executed by a computing device (e.g., a processor, processing circuit, and/or other suitable component) of a wireless communication device or other suitable means for performing the steps. For example, a wireless communication device, such as the UEs 115, 500, and/or 702 may utilize one or more components, such as the processor 502, the memory 504, the BFD module 508, the transceiver 510, the modem 512, and the one or more antennas 516, to execute the steps of method 900. The method 900 may employ similar mechanisms as in the schemes 300 and 400 discussed above with reference to FIGS. 3 and 4, respectively. As illustrated, the method 900 includes a number of enumerated steps, but aspects of the method 800 may include additional steps before, after, and in between the enumerated steps. In some aspects, one or more of the enumerated steps may be omitted or performed in a different order.

In the method 900, a BS (e.g., the BSs 105, 600, and/or 702) may configure a UE (e.g., the UEs 115, 500, and/or 704) to perform BFD in a dormancy BWP (e.g., the BWP 310a). The BS may configure the UE to perform BFD if the UE is configured with implicit BFD RSs for the dormancy BWP. Otherwise, the UE may not perform BFD in the dormancy BWP. An implicit BFD RS may refer to a reference signal indicated by a TCI state of a CORESET in a particular BWP.

Generally speaking, the method 900 includes features similar to method 800 in many respects. For example, blocks 910, 925, 942, 944, and 946 are similar to blocks 810, 825, 842, 844, and 846, respectively. Accordingly, for sake of brevity, details of those blocks will not be repeated here. Please refer to the corresponding descriptions above.

At block 920, the UE determines whether the UE is configured with one or more implicit BFD RSs for the dormancy BWP. For instance, the BS may configure the UE to monitor reference signals indicated by a TCI state of a CORESET in a particular BWP. In some aspects, the UE may utilize one or more components, such as the processor 502, the memory 504, the BFD module 508, the transceiver 510, the modem 512, and the one or more antennas 516, to determine whether the UE is configured with one or more implicit BFD RSs for the dormancy BWP. If the UE determines that the UE is configured with one or more implicit BFD RSs for the dormancy BWP, the UE may proceed to block 930. Otherwise, the UE may proceed to block 925 and refrain from BFD RS monitoring.

At block 930, the UE monitors for the BFD RSs according to the implicit BFD RS configuration. In some aspects, the UE may utilize one or more components, such as the processor 502, the memory 504, the BFD module 508, the transceiver 510, the modem 512, and the one or more antennas 516, to perform BFD RS monitoring according to the BFD RSs in the implicit BFD RS configuration. The UE may configure the transceiver 510 and/or the one or more antennas 516 to monitor for a BFD RS in a certain spatial direction according to spatial parameters (e.g., QCL parameters) associated with the BFD RS.

When the UE is configured with implicit BFD RS(s), the UE may monitor and measure a reference signal (e.g., a BFD RS) that is indicated by a TCI state of a CORESET in a particular BWP as shown by the block 940. Similar to the block 840, the particular BWP may correspond to a non-dormancy BWP before the UE operates in the dormancy BWP as shown by the block 942. As an example, the non-dormancy BWP may be configured with a CORESET similar to the CORESET #0 shown in the CORESET configuration 430 of FIG. 4. The UE may look up a TCI state (e.g., the TCI state 0 for CORESET #0) from the CORESET configuration 430 and look up a reference signal (e.g., the SSB index #n) indicated by the TCI state in the TCI state table 440. The UE may monitor the SSB identified by the index #n indicated by the TCI state 0 for BFD. Additionally or alternatively, UE may perform similar look up for the TCI state 1 of the CORESET #0 and monitor the CSI-RS identified by the index #k indicated by the TCI state 1 for BFD. In some aspects, when there are more than one reference signals in a TCI state for a CORESET, the UE may select the reference signal with a QCL type D in the TCI state for BFD monitoring. For instance, if the TCI state 0 of CORESET #0 may indicate a QCL Type A reference signal and a QCL type D reference signal, the UE may monitor the QCL type D reference signal. Accordingly, the BS may transmit one or more BFD RSs (e.g., SSBs, CSI-RSs, and/or TRSs) in accordance with the reference signals indicated by the TCI state of the CORESET in the non-dormancy BWP before the UE switches to the dormancy BWP.

In some other aspects, the particular BWP may correspond to a non-dormancy BWP paired with the dormancy BWP as shown by the block 944 similar to the block 844. Referring to the example illustrated in FIG. 3, the BS may configure the non-dormancy BWP 310b paired with the dormancy BWP 310a. Thus, for BFD, the UE may monitor reference signal(s) indicated by a TCI state of the CORESETs 320 in the BWP 310b. The UE may determine the BFD RSs for monitoring using substantially similar mechanisms as described for block 942. The BS may transmit one or more BFD RSs (e.g., SSBs, CSI-RSs, and/or TRSs) in accordance with the reference signals indicated by the TCI state of the CORESET in the paired non-dormancy BWP.

In yet other aspects, the particular BWP may correspond to the dormancy BWP as shown by the block 946 similar to the block 846. For instance, the BS may configure a CORESET for the dormancy BWP so that the UE may monitor reference signal(s) indicated by a TCI state of the COREST in the dormancy BWP. Similarly, the BS may configure the CORESET with zero number of PDCCH candidates per aggregation level and per search space so that the UE may not perform PDCCH monitoring in the dormancy BWP. In other words, the UE may determine that there is no search space or PDCCH candidates to be monitored in the dormancy BWP even though a CORESET is configured for the dormancy BWP. In some aspects, the BS may configure the UE with a CORESET (associated with a certain TCI state) in the dormancy BWP to facilitate BFD RS monitoring at the UE, but may refrain from configuring or assigning any PDCCH search space (e.g., no common search space) associated with the CORESET in the dormancy BWP. A common search space is a search that is shared across all UEs. Accordingly, the UE may receive a CORESET configuration for the dormancy BWP, but may not receive any PDCCH search space configuration (e.g., no common search space configuration) for the dormancy BWP, and thus may not perform PDCCH monitoring in the dormancy BWP. In this regard, the BS may configure the UE with a PDCCH configuration including a CORESET configuration (for one or more CORESETs in the BWP), but may not include any other PDCCH monitoring or search space parameters. In some aspects, when there are more than one reference signals in a TCI state for a CORESET, the UE may select the reference signal with a QCL type D in the TCI state for BFD monitoring. For instance, if the TCI state 0 of CORESET #0 may indicate a QCL Type A reference signal and a QCL type D reference signal, the UE may monitor the QCL type D reference signal. In other words, the BS may transmit a QCL Type A reference signal and a QCL type D reference signal in the dormancy BWP, and may receive a beam recovery request from the UE based on the QCL type D reference signal (monitored by the UE). Accordingly, the BS may transmit one or more BFD RSs (e.g., SSBs, CSI-RSs, and/or TRSs) in accordance with the reference signals indicated by the TCI state of the CORESET in the dormancy BWP.

Figure 10:
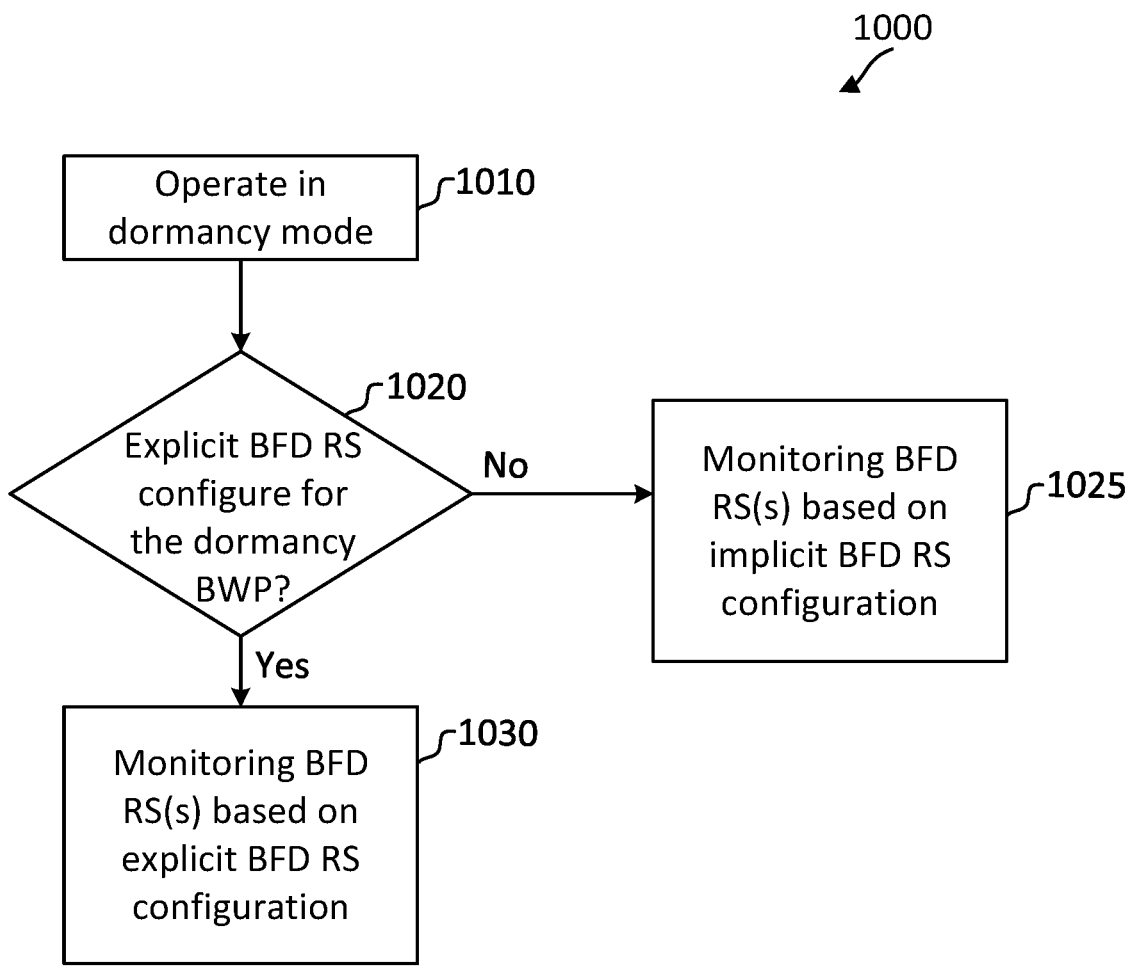
FIG. 10 is a flow diagram of a BFD method for operations in a dormancy mode according to some aspects of the present disclosure.

FIG. 10 is a flow diagram of a BFD method 1000 according to some aspects of the present disclosure. Aspects of the method 1000 can be executed by a computing device (e.g., a processor, processing circuit, and/or other suitable component) of a wireless communication device or other suitable means for performing the steps. For example, a wireless communication device, such as the UEs 115, 500, and/or 702 may utilize one or more components, such as the processor 502, the memory 504, the BFD module 508, the transceiver 510, the modem 512, and the one or more antennas 516, to execute the steps of method 1000. The method 1000 may employ similar mechanisms as in the schemes 300 and 400 discussed above with reference to FIGS. 3 and 4, respectively, and/or the methods 800 and 900 discussed above with reference to FIGS. 8 and 9, respectively. As illustrated, the method 1000 includes a number of enumerated steps, but aspects of the method 1000 may include additional steps before, after, and in between the enumerated steps. In some aspects, one or more of the enumerated steps may be omitted or performed in a different order.

In the method 1000, a BS (e.g., the BSs 105, 600, and/or 702) may configure a UE (e.g., the UEs 115, 500, and/or 704) to perform BFD in a dormancy BWP (e.g., the BWP 310a). The BS may configure the UE to perform BFD if the UE is configured with explicit BFD RSs for the dormancy BWP. Otherwise, the UE may perform BFD based on an implicit BFD configuration.

At block 1010, the UE operates in a dormancy mode for a cell of a wireless communication network, for example, by performing similar operations as at block 810.

At block 1020, the UE determines whether the UE is configured with explicit BFD RSs for the dormancy BWP. The explicitly BFD RS may configured in a similar manner as discussed above with reference to FIG. 8. In some aspects, the UE may utilize one or more components, such as the processor 502, the memory 504, the BFD module 508, the transceiver 510, the modem 512, and the one or more antennas 516, to determine whether the UE is configured with explicit BFD RSs for the dormancy BWP. If the UE determines that the UE is configured with explicit BFD RSs for the dormancy BWP, the UE may proceed to block 1030.

At block 1030, the UE may perform BFD RS monitoring based on the explicit BFD RS, for example, as discussed above at blocks 830 and 840 with reference to FIG. 8.

Returning to the block 1020, if the UE determines that the UE is not configured with an explicit BFD RS, the UE proceeds to block 1025. At block 1025, the UE may perform BFD RS monitoring based on an implicit BFD RS configuration, for example, as discussed above at blocks 930 and 940 with reference to FIG. 9.

Figure 11:
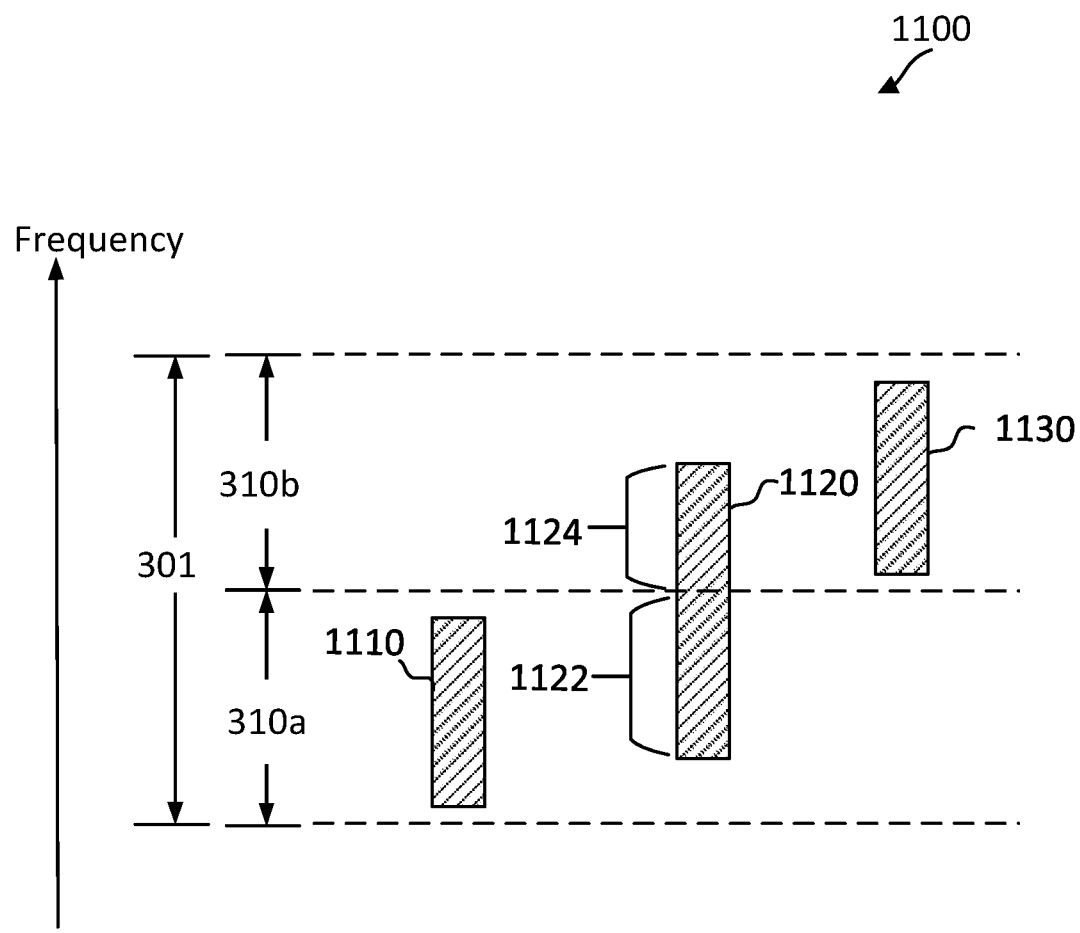
FIG. 11 illustrates a BFD RS measurement scheme according to some aspects of the present disclosure.

FIG. 11 illustrates a BFD RS measurement scheme 1100 according to some aspects of the present disclosure. The scheme 1100 may be employed by BSs such as the BSs 105 and UEs such as the UEs 115 in a network such as the network 100. In particular, a BS (e.g., the BSs 105) may configure a UE (e.g., the UEs 115) to perform BFD RS measurements as shown in the scheme 1100. In FIG. 11, the y-axis represents frequency in some arbitrary units. The scheme 1100 is described using the same frequency band configuration as in the scheme 300, and may use the same reference numerals for simplicity's sake.

The BS may transmit various reference signals in the frequency band 301. For instance, the BS may transmit SSBs in the frequency band 301 to facilitate system synchronization and network access. Additionally, the BS may transmit CSI-RS in the frequency band 301 to enable UEs to perform channel measurements and determine precoding feedback to assist the BS in determining precoding for DL beam formation. Further, the BS may transmit TRSs in the frequency band 301 to facilitate time and/or frequency tracking at the UEs. Each of the SSB, the CSI-RS, and the TRS may span a certain frequency portion in the frequency band 301.

As shown in FIG. 11, the BS may transmit a reference signal 1110, a reference signal 1120, and a reference signal 1130, each spanning a certain frequency band. The reference signals 1110, 1120, 1130 may include an SSB, a CSI-RS, and/or a TRS. Depending on a BWP configuration, the reference signals 1110, 1120, and/or 1130 may be fully within a certain BWP, partially within a certain BWP, or outside a certain BWP. Referring to the same example discussed above in FIG. 3, the BS may configure the BWP 310a as a dormancy BWP for a UE. Thus, the reference signal 1110 is fully within the dormancy BWP 310a. The reference signal 1130 is partially within the dormancy BWP 310a. The reference signal 1110 is outside the dormancy BWP 310a. While the reference signals 1110, 1120, and 1130 are shown to occupy contiguous frequency in the frequency band 301, the reference signals 1110, 1120, and/or 1130 can occupy non-contiguous frequency in the frequency band 301. In general, a reference signal may be transmitted in one or more contiguous or distributed PRBs (e.g., the RBs 210).

The BS may configure the UE to perform BFD RS measurements using the reference signals 1110, 1120, and/or 1130 in various ways. The BS may configure the UE with a BFD RS corresponding to the reference signal 1110, 1120, or 1130. The configuration can be an explicit configuration or an implicit configuration as discussed above with reference to FIGS. 8 and 9 respectively. In some aspects, the BS may configure the UE to measure a BFD RS if the BFD RS (e.g., the reference signal 1110) is fully within the dormancy BWP 310a. Accordingly, the UE may utilize one or more components, such as the processor 502, the memory 504, the BFD module 508, the transceiver 510, the modem 512, and the one or more antennas 516, to receive the BFD RS and determine a measurement (e.g., a reference signal received power (RSRP), a reference signal received quality (RSRQ), and/or a channel quality indicator (CQI)) for the BFD RS.

In some other aspects, the BS may configure the UE to measure a BFD RS (e.g., the reference signal 1120) that is partially within the dormancy BWP 310a. In some instances, the BS may configure the UE to perform measurement for the portion (e.g., the portion 1122) of the BFD RS that is within the dormancy BWP 310a and exclude measurement for the portion (e.g., the portion 1124) of the BFD RS outside of the dormancy BWP 310a. Accordingly, the UE may utilize one or more components, such as the processor 502, the memory 504, the BFD module 508, the transceiver 510, the modem 512, and the one or more antennas 516, to receive the portion of the BFD RS that is within the dormancy BWP 310a and determine a measurement for the portion of the BFD RS in the dormancy BWP 310a. In some other instances, the BS may configure the UE to perform measurement on the entire BFD RS including the portion outside the dormancy BWP 310a. Accordingly, the UE may utilize one or more components, such as the processor 502, the memory 504, the BFD module 508, the transceiver 510, the modem 512, and the one or more antennas 516, to receive the entire BFD RS (including the portion 1122 in the dormancy BWP 310a and the portion 1124 outside the dormancy BWP 310b) and determine a measurement for the entire BFD RS. In some instance, the UE may configure RF components (e.g., filters, gain stages, and/or ADC) to operate at a wider bandwidth that extends outside the dormancy BWP 310a.

In some other aspects, the BS may configure the UE with a BFD RS (e.g., the reference signal 1130) that is outside the dormancy BWP 310*a*. In some instances, the BS may configure the UE to exclude measurement on BFD RSs that are outside the dormancy BWP 310*a*. In some other instances, the BS may configure the UE to extend its frequency band outside the dormancy BWP 310*a* so that the UE may determine measurement for the BFD RS. Accordingly, the UE may configure RF components (e.g., filters, gain stages, and/or ADC) to operate at a wider bandwidth including the BWP where the BFD RS is located and utilize one or more components, such as the processor 502, the memory 504, the BFD module 508, the transceiver 510, the modem 512, and the one or more antennas 516, to receive the BFD RS outside the dormancy BWP 310*b* and determine a measurement for the BFD RS. In some instance, the BS may configure the UE to switch to the BWP (e.g., the BWP 310*b*) where the BFD RS is located for BFD RS measurements. Accordingly, the UE may configure RF components (e.g., filters, gain stages, and/or ADC) to switch to the BWP 310*b* where the BFD RS is located and utilize one or more components, such as the processor 502, the memory 504, the BFD module 508, the transceiver 510, the modem 512, and the one or more antennas 516, to receive the BFD RS in dormancy BWP 310*b* and determine a measurement for the BFD RS.

As discussed above, a BS (e.g., the BSs 105, 600, and/or 702) may configure a UE (e.g., the UEs 115, 500, and/or 704) to operate in a dormancy mode via RRC signaling, DCI signaling, MAC-CE signaling, and/or a WUS. The use of DCI signaling, MAC-CE signaling, and/or WUS to indicate a dormancy mode may allow the BS to dynamically configure the UE to transition between a dormancy mode and a non-dormancy mode or between a switching a BWP between a dormancy BWP and a non-dormancy BWP.

Figure 12A:
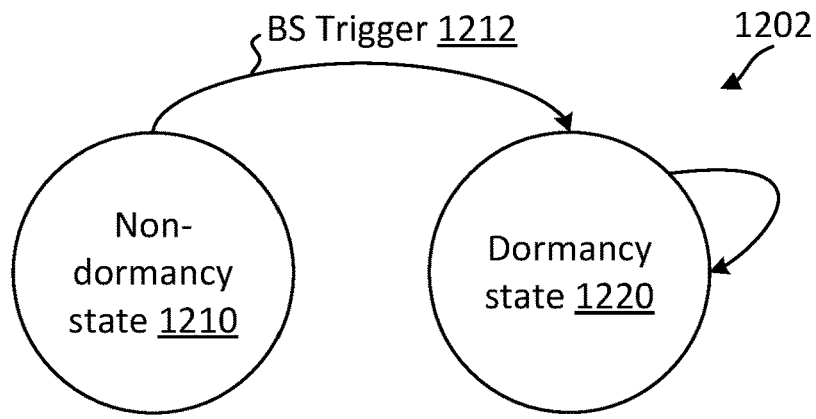
FIG. 12A illustrates a dormancy BWP configuration scheme according to some aspects of the present disclosure.
Figure 12B:
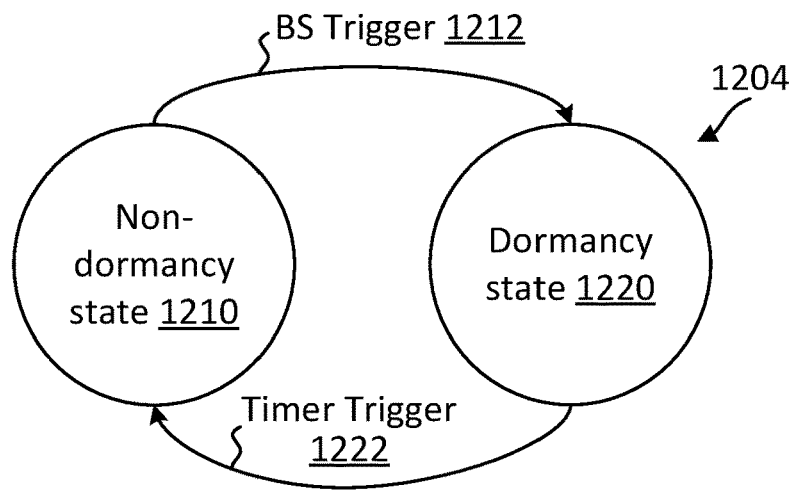
FIG. 12B illustrates a dormancy BWP configuration scheme according to some aspects of the present disclosure.
Figure 12C:
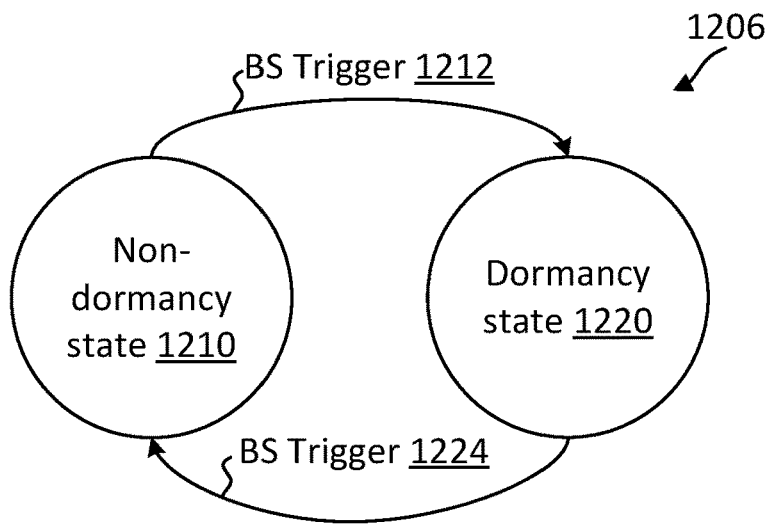
FIG. 12C illustrates a dormancy BWP configuration scheme according to some aspects of the present disclosure.

FIGS. 12A-12C illustrate various mechanisms for a BS (e.g., the BSs 105, 600, and/or 702) to configure a UE (e.g., the UEs 115, 500, and/or 704) to transition between a dormancy state and a non-dormancy state for a configured BWP. FIG. 12A illustrates a dormancy BWP configuration scheme 1202 according to some aspects of the present disclosure. FIG. 12B illustrates a dormancy BWP configuration scheme 1204 according to some aspects of the present disclosure. FIG. 12C illustrates a dormancy BWP configuration scheme 1206 according to some aspects of the present disclosure.

In each of the schemes 1202, 1204, 1206, the BS may configure the UE with a BWP and may configure a non-dormancy state 1210 for the BWP, for example, via an RRC configuration. The UE may perform PDCCH monitoring, communicate UL and/or DL communications with the BS, and/or perform BFD in the configured BWP while in the non-dormancy state 1210. The BS may send a trigger 1212 to the UE to transition the BWP to a dormancy state 1220. The UE may not monitor for PDCCH in the dormancy BWP, but may perform BFD as described herein. In some aspects, the trigger 1212 can be a DCI message. In some other aspects, the trigger 1212 can be a MAC-CE message. In yet other aspects, the trigger 1212 can be a WUS. For example, for power saving, the BS may configure the UE to operate in a power saving mode cycling through wake/sleep cycles. The BS may configure the UE 704 to monitor for a WUS while operating in the power saving mode. The BS may transmit a WUS to the UE to wake the UE up from a power saving mode. The BS may include the trigger 1212 in the WUS.

In the scheme 1202, the transition to the dormancy state 1220 may be permanent. In other words, the trigger 1212 may overwrite the RRC configured BWP permanently. The UE may remain in the dormancy state when operating in the configured BWP.

In the scheme 1204, the UE may operate in the dormancy state 1220 in the RRC configured BWP for a certain duration. In some aspects, the duration can a predetermined, for example, based on a certain wireless communication protocol standard. In some aspects, the duration can be configurable. For instance, the BS may indicate the duration in the trigger 1212 or in a separate configuration message. The UE may configure a timer with an expiration based on the duration configured for the dormancy state 1220. Upon a time expiration trigger 1222, the UE may transition back to the non-dormancy state.

In the scheme 1206, the UE may stay in the dormancy state 1220 until a next trigger is received from the BS. For instance, the BS may transmit trigger 1224 to switch the UE from the dormancy state 1220 back to the non-dormancy state 1210. The trigger 1224 can be substantially similar to the trigger 1212. For instance, the trigger 1224 may be another DCI, MAC-CE, or WUS.

In some aspects, when the trigger 1212 indicates a non-dormancy BWP (e.g., the BWP 310*b*) paired with the dormancy BWP (e.g., the RRC configured BWP transitioning to the dormancy state 1220) and the UE is configured with an explicit BFD RS configuration, the UE may monitor and measure BFD RSs that are QCLed with CORESETs in the paired non-dormancy BWP. In some aspects, when the trigger 1212 indicates a non-dormancy BWP (e.g., the BWP 310*b*) paired with the dormancy BWP (e.g., the RRC configured BWP transitioning to the dormancy state 1220) and the UE is configured with an implicit BFD RS configuration, the UE may monitor and measure BFD RSs that are indicate in TCI states of CORESETs in the paired non-dormancy BWP.

Figure 13:
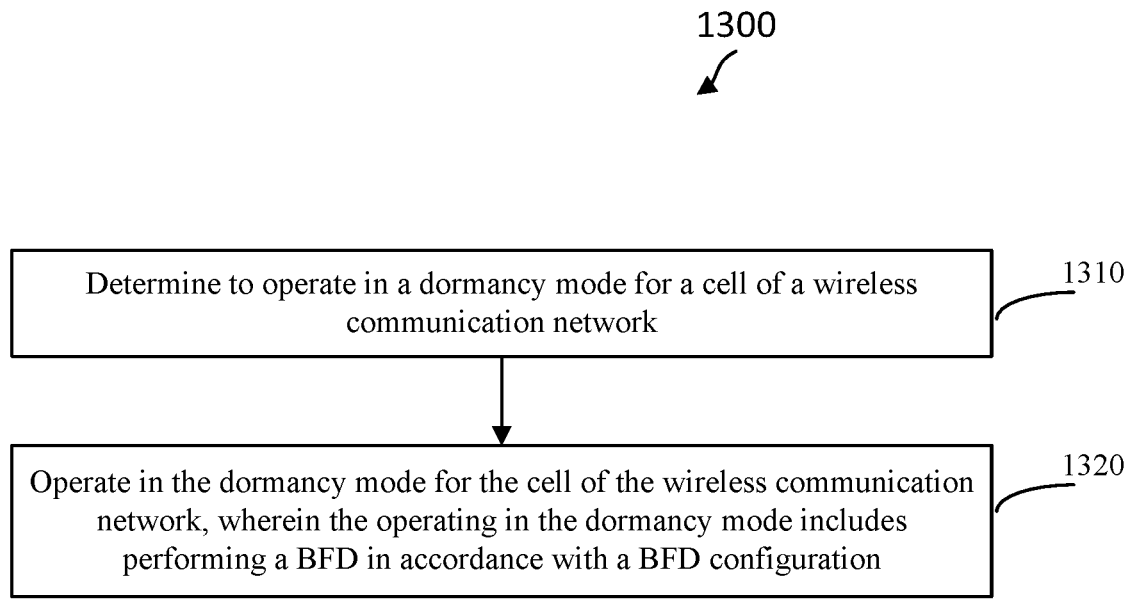
FIG. 13 is a flow diagram of a wireless communication method according to some aspects of the present disclosure.

FIG. 13 is a flow diagram of a wireless communication method 1300 according to some aspects of the present disclosure. Aspects of the method 1300 can be executed by a computing device (e.g., a processor, processing circuit, and/or other suitable component) of a wireless communication device or other suitable means for performing the steps. For example, a wireless communication device, such as the UEs 115, 500, and/or 704 may utilize one or more components, such as the processor 502, the memory 504, the BFD module 508, the transceiver 510, the modem 512, and the one or more antennas 516, to execute the steps of method 1300. The method 1300 may employ similar mechanisms as in the schemes 300, 400, 1100, 1202, 1204, and/or 1206 discussed above with reference to FIGS. 3, 4, 11, 12A, 12B, and/or 12C, respectively, and/or the methods 700, 800, 900, and/or 1000 discussed above with reference to FIGS. 7, 8, 9, and/or 12, respectively. As illustrated, the method 1300 includes a number of enumerated steps, but aspects of the method 1300 may include additional steps before, after, and in between the enumerated steps. In some aspects, one or more of the enumerated steps may be omitted or performed in a different order.

At block 1310, a wireless communication device (e.g., the UEs 115, 500, and/or 704) determines, to operate in a dormancy mode for a cell of a wireless communication network. The wireless communication network may be similar to the network 100. In some aspects, the cell of the network includes a secondary cell. In some aspects, the cell of the network includes a primary cell. In some aspects, the wireless communication device may utilize one or more components, such as the processor 502, the memory 504, the BFD module 508, the transceiver 510, the modem 512, and the one or more antennas 516, to determine operate in the dormancy mode. In some aspects, the wireless communication device may determine to operate in the dormancy mode based on a configuration or trigger received from a BS (e.g., the BSs 105, 600, and/or 702).

At block 1320, the wireless communication device operates in the dormancy mode for the cell of the wireless communication network. The operating in the dormancy mode includes performing a BFD in accordance with a BFD configuration.

In some aspects, the performing the BFD at block 1320 may include refraining from performing the BFD in a dormancy BWP (e.g., the BWP 310a). In some aspects, the performing the BFD at block 1320 may include monitoring for one or more BFD RSs in a dormancy BWP. In some aspects, the wireless communication device may further receive a CORESET configuration for the dormancy BWP, where the monitoring for the one or more BFD RSs is further based on the CORESET configuration for the dormancy BWP. The wireless communication device may operate in the dormancy BWP may when operating in the dormancy mode. The CORESET configuration may indicate one or more CORESETs in the dormancy BWP. However, any CORESET in the dormancy BWP is not for monitoring by the wireless communication device. In some instances, the wireless communication device may determine that there is no search configuration (e.g., a common search space configuration) for the dormancy BWP. In some aspects, the CORESET may include a zero number of PDCCH candidates per aggregation level and per search space.

In some aspects, the performing the BFD at block 1320 may include monitoring for one or more BFD RSs in a BWP when the BFD configuration explicitly indicates the one or more BFD RSs, for example, as discussed above in the method 800 with reference to FIG. 8. In some aspects, the performing the BFD at block 1320 may include refraining from performing the BFD when the BFD configuration fails to explicitly indicate the one or more BFD RSs. In some aspects, the monitoring for the one or more BFD RSs QCLed with a CORESET. In some aspects, the wireless communication device may further determine a first QCL type and a second QCL type are associated with the CORESET, where the monitoring for the one or more BFD RSs QCLed with the CORESET includes monitoring or the one or more BFD RSs QCLed with the CORESET based on the second QCL type. In some aspects, the second QCL type includes QCL type D.

In some aspects, the performing the BFD at block 1320 may include monitoring for one or more BFD RSs in a BWP when the BFD configuration implicitly indicates the one or more BFD RSs, for example, as discussed above in the method 900 with reference to FIG. 9. In some aspects, the performing the BFD at block 1320 may include refraining from performing the BFD when the BFD configuration fails to implicitly indicate the one or more BFD RSs. In some aspects, the monitoring for the one or more BFD RSs includes monitoring for the one or more BFD RSs associated with a TCI state of a CORESET. In some aspects, the wireless communication device may further determine a first QCL type and a second QCL type are associated with the TCI state of the CORESET, where monitoring for the one or more BFD RSs associated with the TCI state of the CORESET includes monitoring for the one or more BFD RSs associated with the TCI state of the CORESET based on the second QCL type. In some aspects, the second QCL type includes QCL type D.

In some aspects, the performing the BFD at block 1320 may include at least one of monitoring, by the wireless communication device, for one or more explicit BFD RSs in a BWP when the BFD configuration explicitly indicates the one or more explicit BFD RSs; or monitoring for one or more implicit BFD RSs in the BWP when the BFD configuration fails to explicitly indicate the one or more explicit BFD RSs, for example, as discussed above in the method 1000 with reference to FIG. 10.

In some aspects, the performing the BFD at block 1320 may include monitoring for one or more BFD RSs in a BWP, wherein the BWP includes a BWP utilized by the wireless communication device before operating in the dormancy mode, for example, as discussed above in the block 842 and 942 with reference to FIGS. 8 and 9, respectively.

In some aspects, the performing the BFD at block 1320 may include monitoring for one or more BFD RSs in a BWP, where the BWP includes a first BWP utilized by the wireless communication device before operating in the dormancy mode and a dormancy BWP utilized by the wireless communication device when operating in the dormancy mode, for example, as discussed above in the block 844 and 944 with reference to FIGS. 8 and 9, respectively.

In some aspects, the performing the BFD at block 1320 may include monitoring for one or more BFD RSs (e.g., the reference signal 1110) fully within a dormancy BWP. In some other aspects, performing the BFD at block 1320 may include monitoring for one or more BFD RSs (e.g., the reference signal 1120) partially within a dormancy BWP, where a first portion of each of the one or more BFD RSs is within the dormancy BWP and a second portion of each of the one or more BFD RSs is outside the dormancy BWP. In yet other aspects, the performing the BFD at block 1320 may include measuring at least one parameter of the first portion of each of the one or more BFD RSs. In some aspects, the performing the BFD at block 1320 may include measuring at least one parameter of each of the one or more BFD RSs based on the first and second portions. In some aspects, the performing the BFD at block 1320 may include refraining from monitoring for one or more BFD RSs outside of a dormancy BWP. In some aspects, the performing the BFD at block 1320 may include monitoring for one or more BFD RSs (e.g., the reference signal 1130) outside of a dormancy BWP.

In some aspects, the wireless communication device may further receive the BFD configuration. In some aspects, the receiving the BFD configuration includes receiving the BFD configuration via at least one of DCI, a MAC-CE, or a WUS. In some aspects, the BFD configuration indicates a first BWP is associated with the dormancy mode and a second BWP is associated with a non-dormancy mode. In some aspects, the BFD configuration has a first duration. In some aspects, the first duration is permanent. In some aspects, the first duration is based on at least one of a timer or a predetermined value. In some aspects, the first duration is based on a number of transitions between the dormancy mode and the non-dormancy mode.

Figure 14:
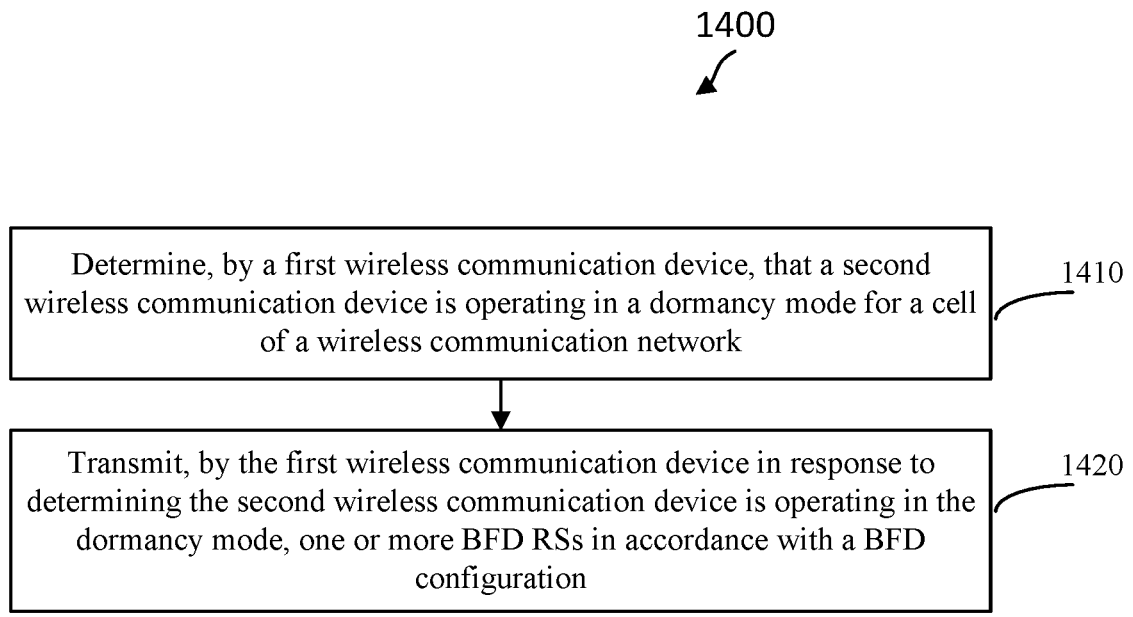
FIG. 14 is a flow diagram of a wireless communication method according to some aspects of the present disclosure.

FIG. 14 is a flow diagram of a wireless communication method 1400 according to some aspects of the present disclosure. Aspects of the method 1400 can be executed by a computing device (e.g., a processor, processing circuit, and/or other suitable component) of a wireless communication device or other suitable means for performing the steps. For example, a wireless communication device, such as the BSs 105, 600, and/or 702 may utilize one or more components, such as the processor 602, the memory 604, the beam configuration and transmission module 608, the transceiver 610, the modem 612, and the one or more antennas 616, to execute the steps of method 1400. The method 1400 may employ similar mechanisms as in the schemes 300, 400, 1100, 1202, 1204, and/or 1206 discussed above with reference to FIGS. 3, 4, 11, 12A, 12B, and/or 12C, respectively, and/or the methods 700, 800, 900, and/or 1000 discussed above with reference to FIGS. 7, 8, 9, and/or 12, respectively. As illustrated, the method 1400 includes a number of enumerated steps, but aspects of the method 1400 may include additional steps before, after, and in between the enumerated steps. In some aspects, one or more of the enumerated steps may be omitted or performed in a different order.

At block 1410, a first wireless communication device (e.g., the BSs 105, 600, and/or 702) determines a second wireless communication device (e.g., the UEs 115, 500, and/or 704) is operating in a dormancy mode for a cell of a wireless communication network. The wireless communication network may be similar to the network 100. In some aspects, the cell of the network includes a secondary cell. In some aspects, the cell of the network includes a primary cell. In some aspects, the first wireless communication device may utilize one or more components, such as the processor 602, the memory 604, the beam configuration and transmission module 608, the transceiver 610, the modem 612, and the one or more antennas 616, to determine that the second wireless communication device is operating in the dormancy mode. In some aspects, the first wireless communication device may determine that the second wireless communication device is operating in the dormancy mode based on a configuration or a trigger transmitted by the first wireless communication device.

At block 1420, the first wireless communication device transmits, in response to determining the second wireless communication device is operating in the dormancy mode, one or more BFD RSs in accordance with a BFD configuration. In some aspects, the first wireless communication device may utilize one or more components, such as the processor 602, the memory 604, the beam configuration and transmission module 608, the transceiver 610, the modem 612, and the one or more antennas 616, to transmit the one or more BFD RSs.

In some aspects, the transmitting the BFD RSs at block 1420 includes transmitting the one or more BFD RSs in a dormancy BWP (e.g., the BWP 310a). In some aspects, the first wireless communication device further transmits a CORESET configuration for the dormancy BWP, where the transmitting the one or mode BFD RSs at block 1420 is further based on the CORESET configuration for the dormancy BWP.

In some aspects, the first wireless communication device further transmits, to the second wireless communication device, the BFD configuration. In some aspects, the BFD configuration explicitly indicates the one or more BFD RSs, for example, as discussed above in the method 800 with reference to FIG. 8. In some aspects, the BFD configuration implicitly indicates the one or more BFD RSs, for example, as discussed above in the method 900 with reference to FIG. 9. In some aspects, the transmitting the BFD configuration includes transmitting to the second wireless communication device, the BFD configuration via at least one of DCI, MAC-CE or a WUS.

In some aspects, the transmitting the one or more BFD RSs at block 1420 includes transmitting the one or more BFD RSs QCLed with a CORESET. In some aspects, the transmitting the one or more BFD RSs at block 1420 includes transmitting the one or more BFD RSs based on a TCI state of a CORESET.

In some aspects, the transmitting the one or more BFD RSs at block 1420 includes transmitting the one or more BFD RSs in a BWP, where the BWP includes a BWP utilized by the second wireless communication device before operating in the dormancy mode, for example, as discussed above in the block 842 and 942 with reference to FIGS. 8 and 9, respectively.

In some aspects, the transmitting the one or more BFD RSs at block 1420 includes transmitting the one or more BFD RSs in a BWP, where the BWP includes a BWP utilized by the second wireless communication device before operating in the dormancy mode and a dormancy BWP utilized by the second wireless communication device when operating in the dormancy mode, for example, as discussed above in the block 844 and 944 with reference to FIGS. 8 and 9, respectively.

In some aspects, the transmitting the one or more BFD RSs at block 1420 includes transmitting the one or more BFD RSs (e.g., the reference signal 1110) fully within a dormancy BWP. In some aspects, the transmitting the one or more BFD RSs at block 1420 includes transmitting the one or more BFD RSs (e.g., the reference signal 1120) partially within a dormancy BWP, where a first portion of each of the one or more BFD RSs is within the dormancy BWP and a second portion of each of the one or more BFD RSs is outside the dormancy BWP. In some aspects, the transmitting the one or more BFD RSs at block 1420 includes transmitting the one or more BFD RSs (e.g., the reference signal 1130) outside of a dormancy BWP.

In some aspects, the BFD configuration indicates a first BWP is associated with the dormancy mode and a second BWP is associated with a non-dormancy mode. In some aspects, the BFD configuration has a first duration. In some aspects, the first duration is permanent. In some aspects, the first duration is based on at least one of a timer or a predetermined value. In some aspects, the first duration is based on a number of transitions between the dormancy mode and the non-dormancy mode.

Figure 15:
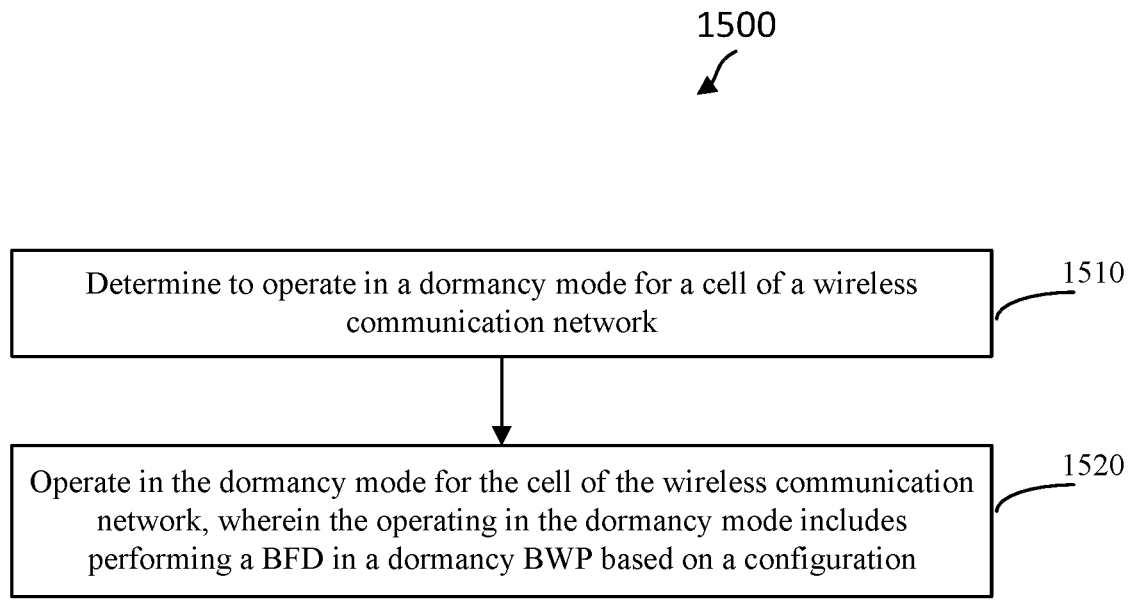
FIG. 15 is a flow diagram of a wireless communication method according to some aspects of the present disclosure.

FIG. 15 is a flow diagram of a wireless communication method 1500 according to some aspects of the present disclosure. Aspects of the method 1500 can be executed by a computing device (e.g., a processor, processing circuit, and/or other suitable component) of a wireless communication device or other suitable means for performing the steps. For example, a wireless communication device, such as the UEs 115, 500, and/or 704 may utilize one or more components, such as the processor 502, the memory 504, the BFD module 508, the transceiver 510, the modem 512, and the one or more antennas 516, to execute the steps of method 1500. The method 1500 may employ similar mechanisms as in the schemes 300, 400, 1100, 1202, 1204, and/or 1206 discussed above with reference to FIGS. 3, 4, 11, 12A, 12B, and/or 12C, respectively, and/or the methods 700, 800, 900, 1000, and/or 1300 discussed above with reference to FIGS. 7, 8, 9, 10, and/or 13, respectively. As illustrated, the method 1300 includes a number of enumerated steps, but aspects of the method 1300 may include additional steps before, after, and in between the enumerated steps. In some aspects, one or more of the enumerated steps may be omitted or performed in a different order.

At block 1510, a UE (e.g., the UEs 115, 500, and/or 704) determines, to operate in a dormancy mode for a cell of a wireless communication network. The wireless communication network may be similar to the network 100. In some aspects, the UE may utilize one or more components, such as the processor 502, the memory 504, the BFD module 508, the transceiver 510, the modem 512, and the one or more antennas 516, to determine operate in the dormancy mode.

At block 1520, the UE operates in the dormancy mode for the cell of the wireless communication network. The operating in the dormancy mode includes performing a beam failure detection (BFD) in a dormancy bandwidth part (BWP) based on a configuration, for example, as discussed above with reference to FIG. 9. In some aspects, the UE may utilize one or more components, such as the processor 502, the memory 504, the BFD module 508, the transceiver 510, the modem 512, and the one or more antennas 516, to operate in the dormancy mode.

In some aspects, the UE further receives the configuration including a control resource set (CORESET) configuration for the dormancy BWP. The performing the BFD at block 1520 includes monitoring in the dormancy BWP based on the CORESET configuration for the dormancy BWP, for one or more BFD reference signals (RSs). In some aspects, the CORESET configuration indicates a CORESET in the dormancy BWP, and the monitoring for the one or more BFD RSs includes monitoring for the one or more BFD RSs associated with a transmission configuration indication (TCI) state of the CORESET. In some aspects, the UE further determines a first QCL type and a second QCL type are associated with the TCI state of the CORESET, and the monitoring for the one or more BFD RSs associated with the TCI state of the CORESET includes monitoring for the one or more BFD RSs associated with the TCI state of the CORESET based on the second QCL type. In some aspects, the second QCL type includes QCL Type D. In some aspects, the operating in the dormancy mode at block 1520 includes refraining from performing physical downlink control channel (PDCCH) monitoring in the dormancy BWP based on the CORESET configuration. In some aspects, the CORESET configuration indicates a CORESET in the dormancy BWP, but does not include any PDCCH search space configuration associated with the CORESET in the dormancy BWP.

Figure 16:
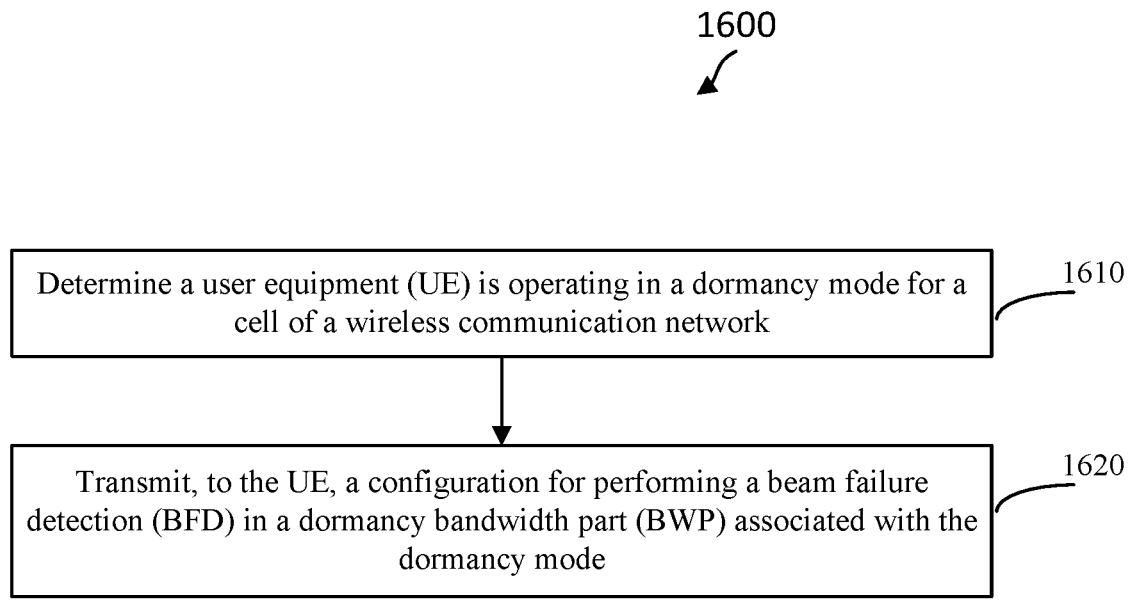
FIG. 16 is a flow diagram of a wireless communication method according to some aspects of the present disclosure.

FIG. 16 is a flow diagram of a wireless communication method 1600 according to some aspects of the present disclosure. Aspects of the method 1600 can be executed by a computing device (e.g., a processor, processing circuit, and/or other suitable component) of a wireless communication device or other suitable means for performing the steps. For example, a wireless communication device, such as the BSs 105, 600, and/or 702 may utilize one or more components, such as the processor 602, the memory 604, the beam configuration and transmission module 608, the transceiver 610, the modem 612, and the one or more antennas 616, to execute the steps of method 1600. The method 1600 may employ similar mechanisms as in the schemes 300, 400, 1100, 1202, 1204, and/or 1206 discussed above with reference to FIGS. 3, 4, 11, 12A, 12B, and/or 12C, respectively, and/or the methods 700, 800, 900, 1000, and/or 1400 discussed above with reference to FIGS. 7, 8, 9, 10, and/or 14, respectively. As illustrated, the method 1600 includes a number of enumerated steps, but aspects of the method 1600 may include additional steps before, after, and in between the enumerated steps. In some aspects, one or more of the enumerated steps may be omitted or performed in a different order.

At block 1610, a BS (e.g., the BSs 105, 600, and/or 702) determines a UE (e.g., the UEs 115, 500, and/or 704) is operating in a dormancy mode for a cell of a wireless communication network. In some aspects, the BS may utilize one or more components, such as the processor 602, the memory 604, the beam configuration and transmission module 608, the transceiver 610, the modem 612, and the one or more antennas 616, to determine that the UE is operating in the dormancy mode.

At block 1620, the BS transmitting, to the UE, a configuration for performing a beam failure detection (BFD) in a dormancy bandwidth part (BWP) associated with the dormancy mode. In some aspects, the transmitting the configuration includes transmitting the configuration including a control resource set (CORESET) configuration for the dormancy BWP. In some aspects, the BS may utilize one or more components, such as the processor 602, the memory 604, the beam configuration and transmission module 608, the transceiver 610, the modem 612, and the one or more antennas 616, to transmit the configuration for performing the BFD in the dormancy BWP.

In some aspects, the BS further transmits, in the dormancy BWP based on the CORESET configuration for the dormancy BWP, one or more BFD RSs. In some aspects, the CORESET configuration indicates a CORESET in the dormancy BWP, and the transmitting the one or more BFD RSs includes transmitting the one or more BFD RSs based on a transmission configuration indication (TCI) state of the CORESET. In some aspects, the transmitting the one or more BFD RSs associated with the TCI state of the CORESET includes transmitting at least one of a first BFD RS of the one or more BFD RSs associated with the TCI state of the CORESET based on a first QCL type or a second BFD RS of the one or more BFD RSs associated with the TCI state of the CORESET based on a second QCL type different from the first QCL type. In some aspects, the second QCL type includes QCL Type D. In some aspects, the BS further determines one or more control resource sets (CORESETs) for the UE in the dormancy BWP, the CORESET configuration indicating the one or more CORESETs. The BS may also further refrains from assigning any physical downlink control channel (PDCCH) search space in the dormancy BWP for the UE.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication by a first user equipment (UE), the method comprising:
   determining to operate in a dormancy mode for a cell of a wireless communication network;
   receiving a configuration including a control resource set (CORESET) configuration for a dormancy bandwidth part (BWP); and
   operating in the dormancy mode for the cell of the wireless communication network, wherein the operating in the dormancy mode includes:
      monitoring, in the dormancy BWP based on the CORESET configuration for the dormancy BWP, for a beam quality of one or more BFD reference signals (RSs), and
      performing a beam failure detection (BFD) in the dormancy BWP based on the configuration and the monitoring.

2. The method of claim 1, wherein the CORESET configuration indicates a CORESET in the dormancy BWP, and wherein the monitoring for the one or more BFD RSs includes:
   monitoring for the one or more BFD RSs associated with a transmission configuration indication (TCI) state of the CORESET.

3. The method of claim 2, further comprising:
   determining a first QCL type and a second QCL type are associated with the TCI state of the CORESET; and
   wherein the monitoring for the one or more BFD RSs associated with the TCI state of the CORESET includes:
      monitoring for the one or more BFD RSs associated with the TCI state of the CORESET based on the second QCL type.

4. The method of claim 3, wherein the second QCL type includes QCL Type D.

5. The method of claim 1, wherein the operating in the dormancy mode includes:
   refraining from performing physical downlink control channel (PDCCH) monitoring in the dormancy BWP based on the CORESET configuration.

6. The method of claim 1, wherein the CORESET configuration indicates a CORESET in the dormancy BWP, and wherein the configuration does not include any PDCCH search space configuration associated with the CORESET in the dormancy BWP.

7. A method of wireless communication performed by a base station (BS), the method comprising:
   determining a user equipment (UE) is operating in a dormancy mode for a cell of a wireless communication network;
   transmitting, to the UE, a configuration for performing a beam failure detection (BFD) in a dormancy bandwidth part (BWP) associated with the dormancy mode, wherein the configuration includes a control resource set (CORESET) configuration for the dormancy BWP; and
   transmitting, in the dormancy BWP based on the CORESET configuration for the dormancy BWP, one or more BFD RSs.

8. The method of claim 7, wherein the CORESET configuration indicates a CORESET in the dormancy BWP, and wherein the transmitting the one or more BFD RSs includes:
   transmitting the one or more BFD RSs based on a transmission configuration indication (TCI) state of the CORESET.

9. The method of claim 8, wherein the transmitting the one or more BFD RSs associated with the TCI state of the CORESET includes transmitting at least one of:
   a first BFD RS of the one or more BFD RSs associated with the TCI state of the CORESET based on a first QCL type; or
   a second BFD RS of the one or more BFD RSs associated with the TCI state of the CORESET based on a second QCL type different from the first QCL type.

10. The method of claim 9, wherein the second QCL type includes QCL Type D.

11. The method of claim 7, further comprising:
   determining one or more control resource sets (CORESETs) for the UE in the dormancy BWP, the CORESET configuration indicating the one or more CORESETs; and
   refraining from assigning any physical downlink control channel (PDCCH) search space in the dormancy BWP for the UE.

12. A user equipment (UE) comprising:
   a memory; and
   a processor coupled with the memory and configured to, when executing instructions stored on the memory, to cause the UE to:
      determine to operate in a dormancy mode for a cell of a wireless communication network;
      receive a configuration including a control resource set (CORESET) configuration for a dormancy bandwidth part (BWP); and
      operate in the dormancy mode for the cell of the wireless communication network, wherein the operating in the dormancy mode includes;
         monitoring, in the dormancy BWP based on the CORESET configuration for the dormancy BWP, for a beam quality of one or more BFD reference signals (RSs), and
         performing a beam failure detection (BFD) in the dormancy BWP based on the configuration and the monitoring.

13. The UE of claim 12, wherein the CORESET configuration indicates a CORESET in the dormancy BWP, and wherein the processor configured to monitor for the one or more BFD RSs is configured to:
  monitor for the one or more BFD RSs associated with a transmission configuration indication (TCI) state of the CORESET.

14. The UE of claim 13, wherein the processor is further configured to:
  determine a first QCL type and a second QCL type are associated with the TCI state of the CORESET; and
  wherein the processor configured to monitor for the one or more BFD RSs associated with the TCI state of the CORESET is configured to:
    monitor for the one or more BFD RSs associated with the TCI state of the CORESET based on the second QCL type.

15. The UE of claim 14, wherein the second QCL type includes QCL Type D.

16. The UE of claim 12, wherein the processor configured to operate in the dormancy mode is configured to:
  refrain from performing physical downlink control channel (PDCCH) monitoring in the dormancy BWP based on the CORESET configuration.

17. The UE of claim 12, wherein the CORESET configuration indicates a CORESET in the dormancy BWP, and wherein the configuration does not include any PDCCH search space configuration associated with the CORESET in the dormancy BWP.

18. A base station (BS) comprising:
  a memory; and
  a processor coupled with the memory and configured to, when executing instructions stored on the memory, to cause the BS to:
    determine a user equipment (UE) is operating in a dormancy mode for a cell of a wireless communication network;
    transmit, to the UE, a configuration for performing a beam failure detection (BFD) in a dormancy bandwidth part (BWP) associated with the dormancy mode, wherein the configuration includes a control resource set (CORESET) configuration for the dormancy BWP; and
    transmit, in the dormancy BWP based on the CORESET configuration for the dormancy BWP, one or more BFD RSs.

19. The BS of claim 18, wherein the CORESET configuration indicates a CORESET in the dormancy BWP, and wherein the processor configured to transmit the one or more BFD RSs is configured to:
  transmit the one or more BFD RSs based on a transmission configuration indication (TCI) state of the CORESET.

20. The BS of claim 19, wherein the processor configured to transmit the one or more BFD RSs associated with the TCI state of the CORESET is configured to transmit at least one of:
  a first BFD RS of the one or more BFD RSs associated with the TCI state of the CORESET based on a first QCL type; or
  a second BFD RS of the one or more BFD RSs associated with the TCI state of the CORESET based on a second QCL type different from the first QCL type.

21. The BS of claim 20, wherein the second QCL type includes QCL Type D.

22. The BS of claim 18, wherein the processor is further configured to:
  determine one or more control resource sets (CORESETs) for the UE in the dormancy BWP, the CORESET configuration indicating the one or more CORESETs; and
  refrain from assigning any physical downlink control channel (PDCCH) search space in the dormancy BWP for the UE.

* * * * *